United States Patent [19]
Kawai

[11] Patent Number: 5,270,779
[45] Date of Patent: Dec. 14, 1993

[54] IMAGE FORMING APPARATUS OPERABLE IN PLURAL OPERATION MODES

[75] Inventor: Yoshihisa Kawai, Toyokawa, Japan

[73] Assignee: Minolta Camera Kabushiki Kaisha, Osaka, Japan

[21] Appl. No.: 589,601

[22] Filed: Sep. 28, 1990

[30] Foreign Application Priority Data

Oct. 2, 1989 [JP] Japan ............................ 1-257391

[51] Int. Cl.$^5$ ............................................. G03G 15/00
[52] U.S. Cl. .................................. 355/313; 355/206; 355/207
[58] Field of Search ............... 355/205, 206, 207, 313, 355/314, 204, 208, 282, 285, 202, 243, 245

[56] References Cited

U.S. PATENT DOCUMENTS

| | | | |
|---|---|---|---|
| 4,113,375 | 9/1978 | Murata et al. | 355/285 |
| 4,161,277 | 7/1979 | Steiner | 355/206 X |
| 4,615,610 | 10/1986 | Yoshiura | 355/208 X |
| 4,627,715 | 12/1986 | Kikuno | 355/206 |
| 4,799,081 | 1/1989 | Kikuno et al. | 355/313 X |
| 4,814,824 | 3/1989 | Ito et al. | 355/313 X |
| 4,862,217 | 8/1989 | Russel | 355/218 |
| 4,864,350 | 9/1989 | Ishiguro et al. | 355/311 |
| 4,864,365 | 9/1989 | Ito | 355/207 |
| 4,888,616 | 12/1989 | Nanamura et al. | 355/202 |
| 4,924,274 | 5/1990 | Ito et al. | 355/313 |
| 4,956,667 | 9/1990 | Gartner | 355/202 |
| 5,006,904 | 4/1991 | Matsuo et al. | 355/313 |
| 5,063,459 | 11/1991 | Nakatani et al. | 355/285 X |
| 5,068,675 | 11/1991 | Momose | 355/285 X |
| 5,081,493 | 1/1992 | Miyasaka | 355/285 X |

FOREIGN PATENT DOCUMENTS

| | | | |
|---|---|---|---|
| 0246765 | 11/1986 | Japan | 355/206 |
| 0087378 | 4/1987 | Japan | . |
| 0095051 | 4/1989 | Japan | . |

Primary Examiner—A. T. Grimley
Assistant Examiner—Robert Beatty
Attorney, Agent, or Firm—Burns, Doane, Swecker & Mathis

[57] ABSTRACT

An image forming apparatus operable in plural operation modes, one operation mode is set among the plural operation modes, and an operation condition is set in each of the plural operation modes. A controller judges whether or not the set operation condition is inhibited in the set operation mode, and further warns the operator of the judgment result when the controller judges that the set operation condition is inhibited in the set operation mode. If an operation condition is inhibited in a particular operation mode it is possible to set an irregular mode setting and disable the inhibition of the apparatus. Controls are provided to permit transmission of an electric signal from a reading station to an external unit while, at the same time, inhibiting the operation of an image fixing device while the image fixing device is warmed up.

14 Claims, 13 Drawing Sheets

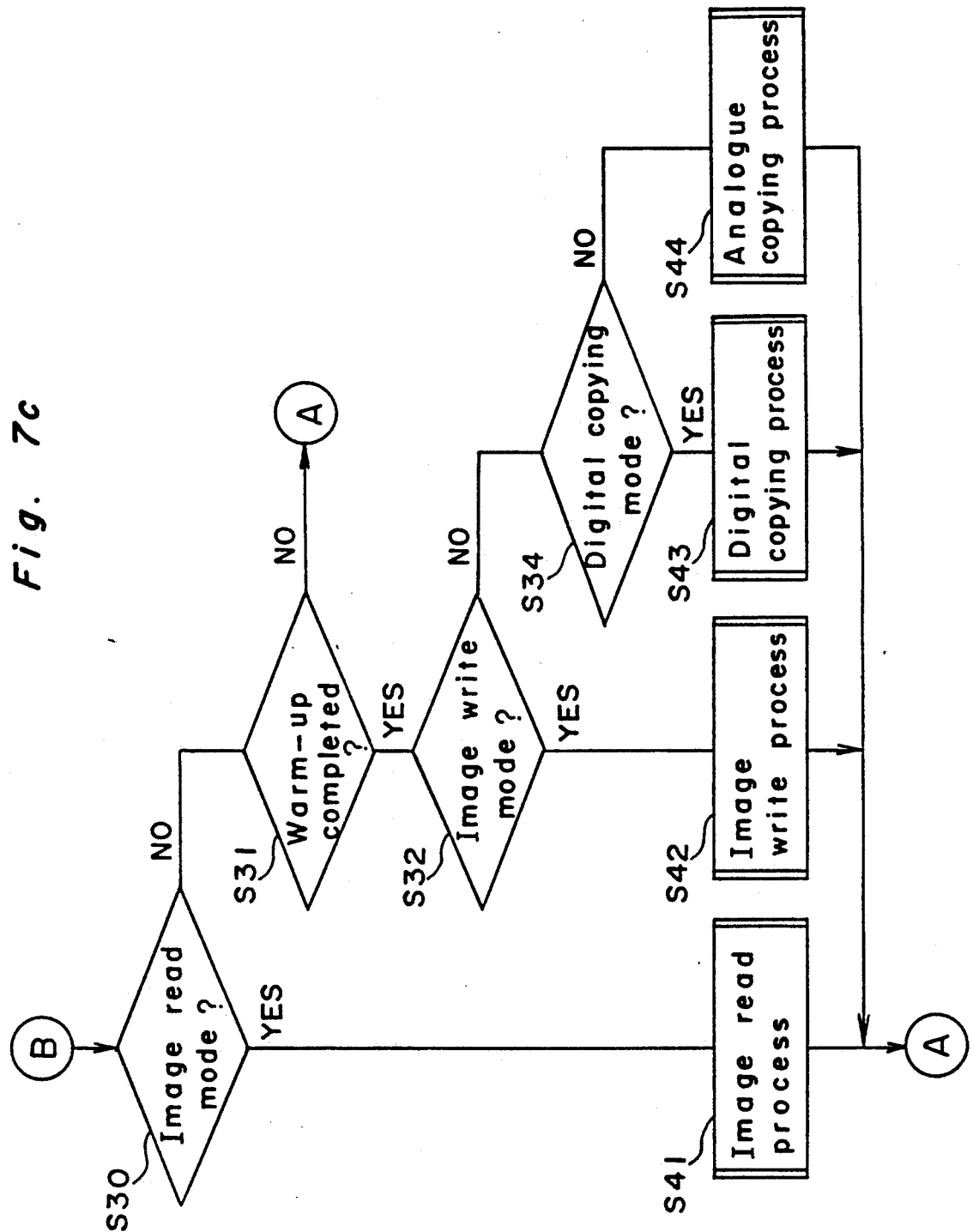

IMAGE FORMING APPARATUS OPERABLE IN PLURAL OPERATION MODES

BACKGROUND OF THE INVENTION

1. Field of the Invention

The present invention relates to an image forming apparatus operable in plural operation modes, and more particularly, to an image forming apparatus operable in plural operation modes such as an electrophotographic copying machine comprising plural operation modes such as analogue and digital copying modes.

2. Description of Related Art

Conventionally, in electrophotographic copying machines, there have been put into practical use an analogue copying machine for forming a latent image on a photoconductor and developing the latent image into a visible toner image so as to print a so-called analogue image on a sheet of copying paper, and a digital copying machine for printing dot images or so-called digital image on a sheet of copying paper according to digital image data. Further, a copying machine of composite function type comprising an analogue copying system and a digital copying system is proposed, for example, in the Japanese patent laid open publication (JP-A) No. 55-123270/1980.

In the copying machine of composite function type, the analogue and digital copying systems utilize a common electrophotographic printing section. However, the analogue copying system utilizes an exposure optical system for projecting light reflected from a document onto a photoconductor. On the other hand, the digital copying system utilizes an image read section using a CCD image sensor or the like, and an image write section such as laser printer or the like. Either the analogue copying system or the digital copying system of the copying machine of composite function type can be used depending on the use so as to make the best use of the features of each copying system. For example, when a copy which has been produced by the digital copying system is recopied, degradation in the quality of the image can be reduced by reproducing the copy using the analogue copying system. Furthermore, an analogue half tone image and a digital binary image can be composed by the copying machine of composite function type.

However, since the copying machine of composite function type has many functions, it is difficult to set the operation conditions such as selection of developing units in each operation mode. Therefore, there is caused such a problem that the copying machine of composite function type can not operate in the operation mode if operation conditions set by the operator do not conform to operation conditions which are inhibited or are not permitted therein.

SUMMARY OF THE INVENTION

An essential object of the present invention is to provide an image forming apparatus operable in plural operation modes, which is capable of giving a suggestion of the operation to the operator even though operation conditions set by the operator do not conform to operation conditions which are not permitted in the set operation mode, and further becoming operable in the set operation mode after the operator operates according to the suggestion.

Another object of the present invention is to provide an image forming apparatus operable in plural operation modes, which is capable of setting predetermined initial operation conditions so as to operate in a normal state when the set operation conditions are inhibited in the altered operation mode after the operation mode is altered.

A further object of the present invention is to provide an image forming apparatus operable in plural operation modes, which is capable of automatically altering the operation mode in a predetermined manner and setting initial setting operation conditions corresponding to the altered operation mode when it is judged that the apparatus can not operate in the set operation mode.

A still further object of the present invention is to provide an image forming apparatus operable of in plural operation modes, which is capable of inhibiting the operation of the apparatus when the set operation conditions are irregular in the set operation mode, and thereafter, permitting predetermined operations of the apparatus when an irregular mode is set by the operator.

In order to accomplish the aforementioned objects, according to one aspect of the present invention, there is provided an image forming apparatus operable in plural operation modes comprising:

first setting means for setting one operation mode among said plural operation modes;

second setting means for setting an operation condition in each of said operation modes;

judgment means for judging whether or not said operation condition set by said second setting means is inhibited in the operation mode set by said first setting means; and warning means responsive to said judgment means for warning.

According to another aspect of the present invention, there is provided an image forming apparatus operable in plural operation modes comprising:

first setting means for setting one operation mode among said plural operation modes;

second setting means for setting an operation condition in each of said operation modes;

storage means for storing a predetermined operation condition corresponding to respective operation modes;

judgment means for judging whether or not said operation condition set by said second setting means is inhibited in the operation mode set by said first setting means; and control means, when the operation mode is altered by said first setting means after said operation condition is set by said second setting means, for setting said predetermined operation condition stored by said storage means corresponding to the altered operation mode in the case that it is judged by said judgment means that said operation condition set by said second setting means is inhibited in the altered operation mode.

According to a further aspect of the present invention, there is provided an image forming apparatus operable in plural operation modes comprising:

setting means for setting one operation mode among said plural operation modes;

judgment means for judging whether or not said apparatus can operate in said operation mode set by said setting means; and alteration means for altering said operation mode in a predetermined manner when it is judged by said judgment means that said apparatus can not operate in said operation mode set by said setting means.

According to a still further aspect of the present invention, there is provided an image forming apparatus operable in plural operation modes comprising:

first setting means for setting one operation mode among said plural operation modes;

second setting means for setting an operation condition in each of said operation modes;

inhibition means for inhibiting the operation of said apparatus when said operation condition set by said second setting means is an irregular condition in the operation mode set by said first setting means;

irregular mode setting means for setting an irregular mode; and cancellation means for disabling said inhibition means when said irregular mode is set by said irregular mode setting means.

According to a still more further aspect of the present invention, there is provided an image forming apparatus operable in plural operation modes, comprising:

reading means for reading an image of a document and generating an electric signal corresponding to said image of said document;

transmission means for transmitting said electric signal generated by said reading means to an external unit;

image forming means for forming a toner image on a paper according to said electric signal transmitted from said reading means;

fixing means for fixing said toner image formed on the paper;

setting means for setting one operation mode among said plural operation modes, said plural operation modes including: a first operation mode in which said electric signal is transmitted to said external unit by said transmission means, and a second operation mode in which a toner image is formed on the paper by said image forming means; and control means for permitting the operation of said first operation mode and inhibiting the operation of said second operation mode while a warm-up process of said fixing means is executed after a main power switch of said apparatus is turned on.

BRIEF DESCRIPTION OF THE DRAWINGS

These and other objects and features of the present invention will become clear from the following description taken in conjunction with the preferred embodiment thereof with reference to the accompanying drawings, in which:

FIGS. 7a to 7c are flowcharts showing a main routine which is executed by a main system controller shown in FIG. 4;

DETAILED DESCRIPTION OF THE PREFERRED EMBODIMENT

An electrophotographic copying machine of composite function type of a preferred embodiment according to the present invention will be described below in the order of the following items, with reference to attached drawings.

(a) Composition of copying machine
(b) Analogue copying mode
(c) Digital copying mode
(d) Composition of Control system
(e) Operation panel
(f) Control flow of control system
   (f-1) Main routine
   (f-2) Analogue copying process
   (f-3) Image read process
   (f-4) Image write process
   (f-5) Digital copying process
   (f-6) Unit setting process The electrophotographic copying machine of composite function type of the preferred embodiment comprises four operation modes: an analogue copying mode (AC mode), a digital copying mode (DC mode), an image read mode (RE mode) and an image write mode (WR mode), and further comprises a normal mode for performing a normal process in each operation mode, and an irregular mode for performing an irregular process in the case of checking the performance of the copying machine such as a maintenance.

In the electrophotographic copying machine of composite function type, in the case that the operation mode is altered, when operation conditions set in the altered operation mode are inhibited or are not permitted or the set operation conditions do not conform to the operation conditions permissive in the operation mode, the operation conditions are set at initial conditions preset to the operation mode. Further, in the case that the operation condition is altered, when the altered operation condition does not conform to the operation condition permissive in the set operation mode, such a warning (referred to as an invalid warning hereinafter) that the set operation condition is invalid is given to the operator.

(a) Composition of copying machine

Figure 1:
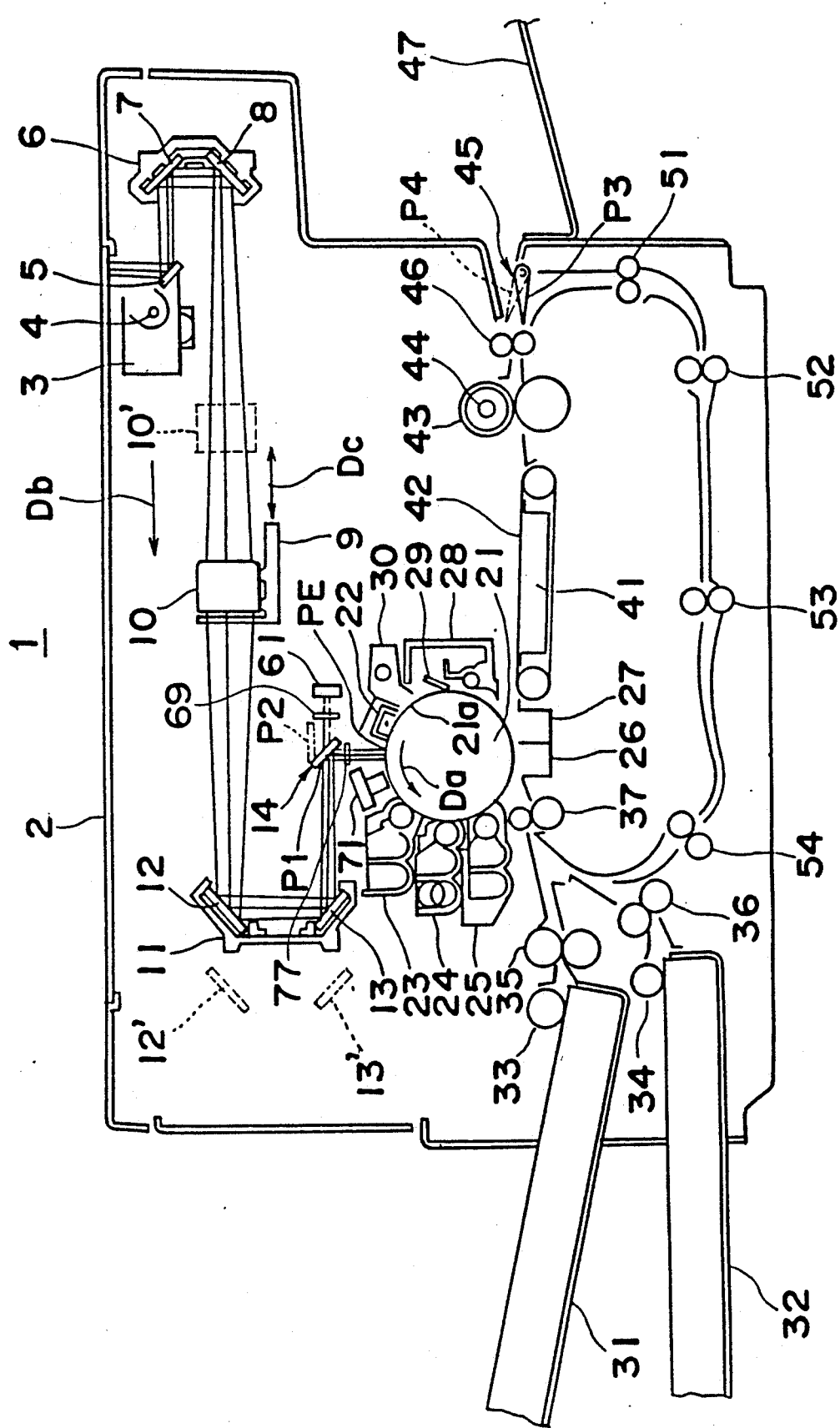
FIG. 1 is a schematic cross sectional view showing a composition of an electrophotographic copying machine of composite function type of a preferred embodiment according to the present invention.

FIG. 1 shows the composition of the electrophotographic copying machine 1 of composite function type of the preferred embodiment according to the present invention.

Referring to FIG. 1, the electrophotographic copying machine 1 mainly comprises a pivotable reflection mirror 14 which is arranged at the most nearest position to a photoconductive drum 21 among plural reflection mirrors constituting an optical system, a line type CCD image sensor 61 for reading an image, and an LED head 71 for writing an image and peripheral circuits thereof, in addition to a conventional analogue electrophotographic copying machine, wherein the pivotable mirror 14 can be rotated and the position thereof is switched over between either a first position P1 or a second position P2, as described later.

The electrophotographic copying machine 1 comprises the analogue copying mode, the digital copying mode, the image read mode for reading an image using the CCD image sensor 61, and the image write mode for writing an image on the photoconductive drum 21 using the LED head 71. The electrophotographic copying machine 1 can be used as a facsimile after a telecommunication control section for transmitting image information through a telephone line and for receiving image information therethrough is added thereto.

One of the points different from the conventional copying machine is that the electrophotographic copying machine 1 comprises the CCD image sensor 61 and the LED head 71 which are used in the digital copying mode, in addition to a scan optical system for scanning light reflected from a document which is used in the analogue copying mode.

In the analogue copying mode, the position of the pivotable mirror 14 is switched over so as to be located at the first position P1. Then, a document set on an optically transparent glass document table 2 is illuminated by an illumination lamp 4 arranged within an illumination unit 3. After light reflected from the document passes through the scan optical system constituted by a reflection mirror 5 mounted on the illumination unit 3, reflection mirrors 7 and 8 mounted on a mirror unit 6, a scan lens 10 mounted on a lens support 9, reflection mirrors 12 and 13 mounted on a mirror unit 11, and the pivotable mirror 14, the light is incident onto a photoconductive layer 21a of the photoconductive drum 21 so as to form a document image thereon. It is to be noted that an exposure point on the photoconductive layer 21a is indicated by a reference PE as shown in FIG. 1.

On the other hand, in the digital copying mode or the image read mode, among an optical system for enabling light reflected from the document to transmit from the document to the image sensor 61, there is used a part of the optical system for enabling the reflected light to transmit to the pivotable mirror 14 in common with that used in the analogue copying mode, and the image sensor 61 is arranged at a position optically equivalent to the exposure point PE on the photoconductive layer 21a of the photoconductive drum 21. In the digital copying mode or the image read mode, the pivotable mirror 14 is rotated so that the position thereof is located at the second position P2, resulting in that the pivotable mirror 14 is apart from the optical path. Then, the light reflected from the reflection mirror 13 reaches the image sensor 61 without obstruction of the pivotable mirror 14. Since the optical path upon reading an image in the digital copying mode is almost common to that in the analogue copying mode, the composition of the electrophotographic copying machine 1 becomes simple.

Another of the points different from the conventional analogue copying machine is not only to switch over the polarity of the voltage for transferring a toner image to be applied to a transfer charger 26 between positive and negative but also to provide plural developing units 23, 24 and 25 containing toner having polarities different from each other. Namely, in the analogue copying mode, a normal developing operation is performed. On the other hand, in the digital copying mode or the image write mode, a reverse developing operation is performed.

Around the photoconductive drum 21 which is rotated in the counterclockwise direction as indicated by an arrow Da, there are provided a corona charger 22, the red normal developing unit 23, the black reverse developing unit 24 and the black normal developing unit 25, the transfer charger 26, a cleaning unit 28 and an eraser lamp 30, in the manner similar to that of the conventional electrophotographic copying machine.

After an electrostatic latent image is formed on the photoconductive layer 21a of the photoconductive drum 21 which has been electrified uniformly with a negative electric potential by the corona charger 22, the electrostatic latent image is developed into a visible toner image by one of the developing units 23, 24 and 25. Thereafter, the toner image is transferred onto a sheet of copying paper by the transfer charger 26. The toner remaining on the photoconductive layer 21a of the photoconductive drum 21 is removed by the cleaning unit 28, and then, the photoconductive layer 21a is discharged by illuminating the surface thereof using the eraser lamp 30. On the other hand, the toner image formed on a sheet of copying paper is fixed by a fixing roller 43, and is discharged to a paper discharging tray 47.

In this process of the analogue copying mode, since the light reflected from the document is scanned in such a state that the photoconductive layer 21a of the photoconductive drum 21 is electrified uniformly with a negative electric potential, an electrostatic latent image is formed on a portion of the photoconductive layer 21a where the charge remains. In this case, when the electrostatic latent image is developed into a visible toner image in the normal developing operation by the developing unit 23 or 25 containing toner having positive electric potential, and the toner image having positive electric potential is formed on the photoconductive layer 21a of the photoconductive drum 21. Then, when a negative voltage is applied to the transfer charger 26, the toner image is transferred onto a sheet of copying paper.

On the other hand, in the digital copying mode or the image write mode, the LED head 71 is turned on so as to emit above an image portion of the photoconductive layer 21a of the photoconductive drum 21 which has been electrified uniformly with a negative electric potential in order to shorten a time interval upon supplying the power to the LED head 71 so as to lengthen the life of the LED head 71. Then, the charge of the image portion disappears therefrom, and the electrostatic latent image is formed thereon. Thereafter, when the electrostatic latent image is developed in the reverse developing operation by the developing unit 24 containing toner having negative electric potential, a visible toner image having the negative electric potential is formed on the image portion where the charge has disappeared. Thereafter, when a positive voltage is applied to the transfer charger 26, the toner image is transferred onto a sheet of copying paper.

It is to be noted that, the LED head 71 used in the digital copying mode or the image write mode is arranged between the corona charger 22 and the developing unit 23.

In the present preferred embodiment, a sheet of copying paper is fed from one of paper feeding cassettes 31 and 32 through a register roller 37 to a transfer section comprising the transfer charger 26.

Furthermore, there is provided a paper refeeding system comprising a pivotable gating pawl member 45 and transportation rollers 51 to 54, so that a sheet of copying paper on which a toner image is fixed is transported to the register roller 37, again. Therefore, there can be performed such a composite copying process that information such as date is printed in the digital copying mode on a sheet of copying paper on which an analogue image has been printed thereon in the analogue copying mode. Since an analogue image and a digital image can be composed so as to print the composite image thereof on a sheet of copying paper, the electrophotographic copying machine 1 can be applied to a wider range of application.

In the present preferred embodiment, the optical paths in the digital copying mode and the optical path in the analogue copying mode are switched over by using the pivotable mirror 14. However, an optically semitransparent mirror may be used in place of the pivotable mirror 14. In this case, since the semitransparent mirror is mounted fixedly, it is not necessary to provide the movable portion thereof. In the analogue copying mode, one portion of the light reflected from the document is reflected by the semitransparent mirror, and then, the light is incident onto the photoconductive layer 21a of the photoconductive drum 21. On the other hand, in the digital copying mode, when the light reflected from the document is incident onto the semitransparent mirror, the light passes therethrough, and then, the light is incident onto the CCD image sensor 61 and is detected by the CCD image sensor 61. In the image write operation of the digital copying mode, since it is necessary to expose the photoconductive drum 21 to light in such a state that the exposure light is not incident thereto from the semitransparent mirror, the image read operation and the image write operation are performed so that a timing of the image read operation is suitably shifted from a timing of the image write operation.

(b) Analogue copying mode

The operation of the analogue copying mode and respective sections of the electrophotographic copying machine 1 will be described below.

In FIG. 1, the illumination unit 3 and the mirror unit 6 are located at a home position. Upon copying a document image in the analogue copying mode or upon reading an image using the image sensor 61, the illumination unit 3 and the mirror unit 6 of the optical system are moved in the left direction as indicated by an arrow Db at a predetermined speed by a mechanism (not shown) including a driving motor which is well known to those skilled in the art so as to scan the document image in a slit form. Then, the illumination unit 3 and the mirror unit 6 are moved so that a ratio of the movement speed of the illumination unit 3 to the movement speed of the mirror unit 6 becomes two and the optical length between the surface of the document and the scan lens 10 is kept constant at all times.

In FIG. 1, there are shown the positions of respective units of the optical system when the document image is scanned at a magnification of one or in an equal magnification mode, namely, in such a state that a magnification of an electrostatic latent image formed on the photoconductive layer 21a of the photoconductive drum 21 to an actual document image of a document set on the document table 2 is set at one. In the equal magnification mode, the movement speed of the illumination unit 3 and the rotation speed of the photoconductive drum 21 are adjusted so that they are substantially equal to each other.

The lens support 9 for mounting the scan lens 10 is moved in the left and right directions as indicated by arrows Dc in FIG. 1 by a mechanism (not shown) well known to those skilled in the art, so that the magnification can be changed.

When the magnification is set at two, the scan lens 10 is moved to a position as indicated by a numerical reference 10'. Then, in order to set the surface of the photoconductive layer 21a to a focal plane so as to correct the correction conjugate length of the optical path, the mirror unit 11 is moved so that the mirrors 12 and 13 are located at respective positions as indicated by numerical references 12' and 13'. Furthermore, since the rotation speed of the photoconductive drum 21 is set at a predetermined constant speed independent of the magnification, the movement speed of the illumination unit 3 is adjusted so as to be half the speed at the equal magnification.

It is to be noted that, in the present preferred embodiment, the photoconductive layer 21a of an organic photoconductor (OPC) is formed on the photoconductive drum 21 of aluminum, and the photoconductive layer 21a is electrified with a positive electric potential by the corona charger 22.

When the scanned document image is formed on the electrified photoconductive layer 21a, the charge having a negative electric potential on the photoconductive layer 21a disappears according to the intensity of the light reflected from the document. Namely, the charge corresponding to a bright portion of the document disappears from the photoconductive layer 21a and the charge corresponding to a dark portion thereof remains thereon, so that an electrostatic latent image corresponding to the document image is formed thereon.

As described above, around the photoconductive drum 21, there are arranged the developing units 23, 24 and 25 for developing an electrostatic latent image into a visible image with toner. In the present preferred embodiment, the developing unit 23 contains red color toner having a positive electric potential, the developing unit 24 contains black color toner having a negative electric potential, and the developing unit 25 contains black toner having a positive electric potential. Therefore, the developing unit 23 or 25 is used in the analogue copying mode.

Figure 2:
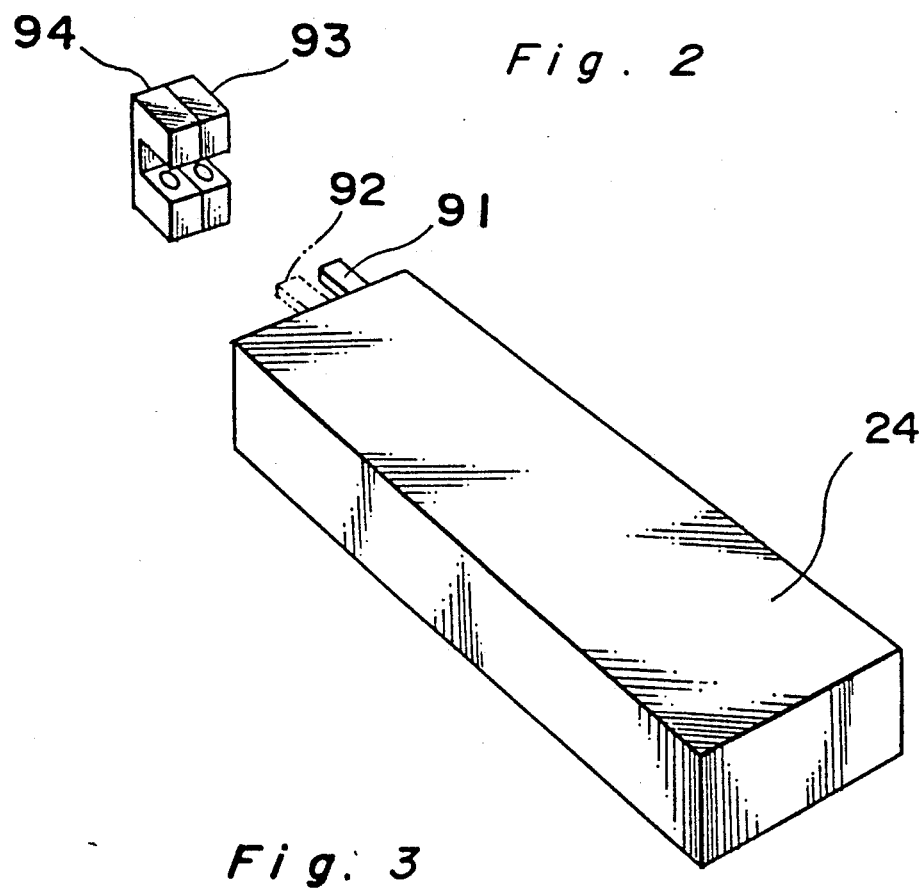
FIG. 2 is a perspective view showing a developing unit arranged in the electrophotographic copying machine shown in FIG. 1, and photointerrupter switches, each of which is arranged so as to oppose to each developing unit.

On the developing unit 24 containing the toner having the negative electric potential, a projection 91 is formed as shown in FIG. 2. When the developing unit 24 is mounted at a predetermined position in the electrophotographic copying machine 1, a photointerrupter switch 93 is turned on. Further, on each of the developing units 23 and 25 containing the toner having the positive electric potential, a projection 92 is formed at a position as indicated by a dotted line shown in FIG. 2. When each of the developing units 23 and 25 is mounted at the predetermined position in the electrophotographic copying machine 1, a photointerrupter switch 94 is turned on. Therefore, the polarity of the toner contained in each developing unit can be judged based on the switching state of each of the photointerrupter switches 93 and 94.

Figure 4:
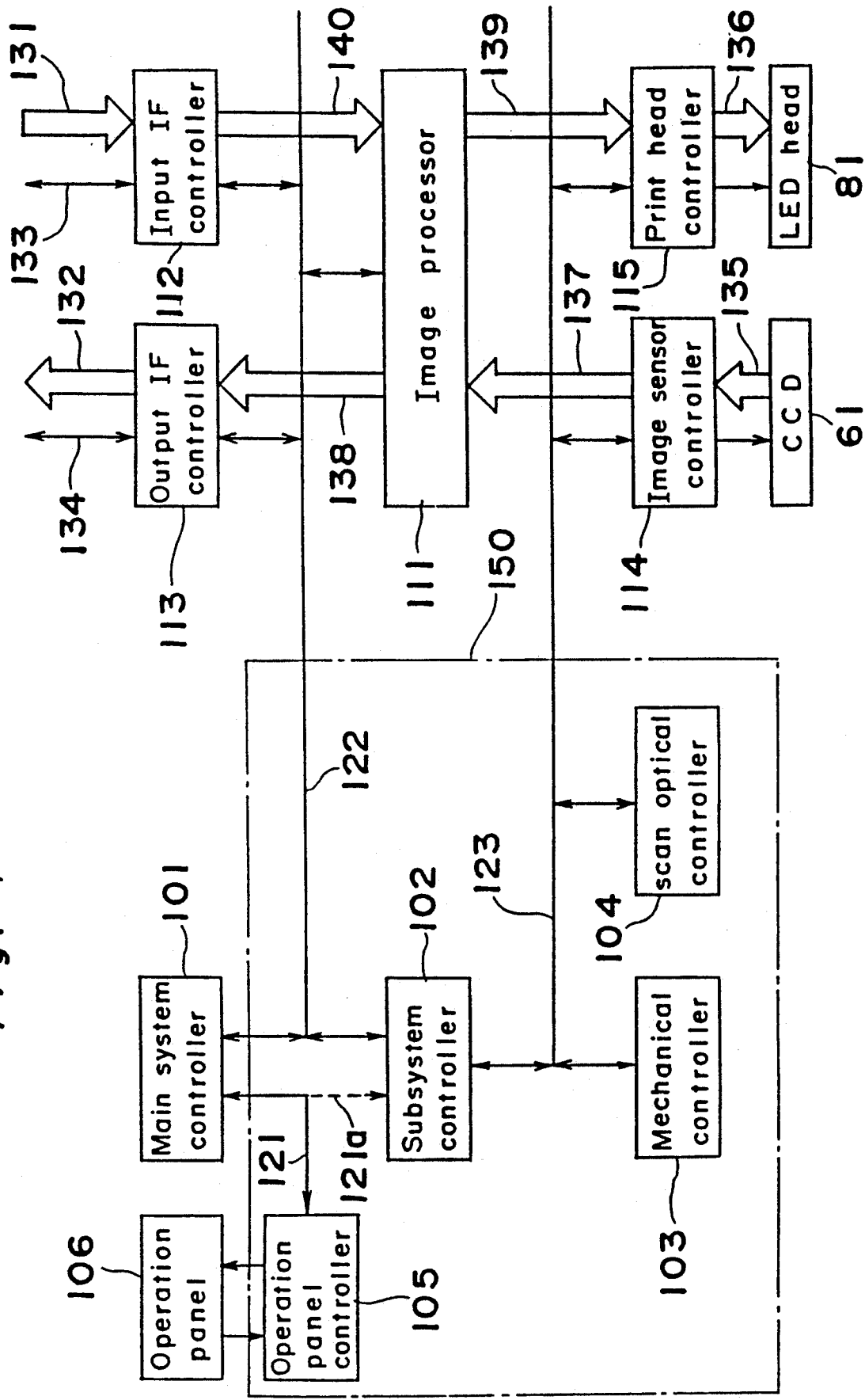
FIG. 4 is a schematic block diagram showing a control system of the electrophotographic copying machine shown in FIG. 1.

Responsive to an instruction entered using an operation panel 106 shown in FIG. 4, only one of these developing units 23, 24 and 25 is enabled to develop, and the other are disabled.

When the developing unit 25 is selected in the analogue copying mode, a portion of an electrostatic latent image formed on the photoconductive layer 21a which has been electrified with a negative electric potential is developed with black color toner having the positive electric potential into a visible toner image corresponding to a document image. Similarly, when the developing unit 23 is selected, an electrostatic latent image is developed into a visible toner image with red color toner having the positive electric potential. On the other hand, when the developing unit 24 is selected in the digital copying mode, a negative/positive reversed image is formed on the photoconductive layer 21a.

On the other hand, paper feeding cassettes 31 and 32, on which copying papers are set, are detachably mounted onto the electrophotographic copying machine 1, and only one of the paper feeding cassettes 31 and 32 is selected. When the paper feeding cassette 31 is selected, a sheet of copying paper is picked up from the paper feeding cassette 31 by a pick up roller 33 which is driven responsive to a control signal generated at a predetermined timing, and is transported toward the register roller 37 by a transportation roller 35. Thereafter, a sheet of copying paper is stopped at the register roller 37 in such a state that the edge thereof reaches the register roller 37. On the other hand, when the paper feeding cassette 32 is selected, a sheet of copying paper is picked up therefrom by a pick up roller 34, and is transported toward the register roller 37 by a transportation roller 36. Thereafter, a sheet of copying paper is stopped at the register roller 37 in such a state that the edge thereof reaches the register roller 37.

When the edge of the visible toner image developed by one of the developing units 23, 24 and 25 reaches a predetermined position, the register roller 37 is driven by a control system described in detail later, and then, a sheet of copying paper starts to run.

When a sheet of copying paper is in contact with the photoconductive layer 21a of the photoconductive drum 21, the charge having an electric potential of a polarity opposite to that of toner is given to a sheet of copying paper from the back side thereof by the transfer charger 26, so that not only a sheet of copying paper is stuck closely to the photoconductive layer 21a but also the toner image formed on the photoconductive layer 21a is transferred onto a sheet of copying paper. Thereafter, a sheet of copying paper is separated by a separating charger 27 to which an alternating-current high voltage is applied.

Almost all the toner adhering on the photoconductive layer 21a is transferred onto a sheet of copying paper 40, however, a small amount of toner is not transferred thereonto, and then, the toner remains on the photoconductive layer 21a. After the residual toner is scraped off by a cleaning blade 29 arranged in a cleaning unit 28, it is collected into a waste toner bottle (not shown). Since some charge remains on the photoconductive layer 21a in such a state, the whole surface of the photoconductive layer 21a is exposed to light by an eraser lamp 30, and then, the photoconductive layer 21a becomes the initial state with no charge.

A sheet of copying paper having been separated from the photoconductive drum 21 is sucked by a suction unit 41 and is transported to a fixing roller 43 by a transportation belt 42.

A heating lamp 44 is arranged within a fixing roller 43, and the temperature of the surface of the fixing roller 43 is kept constant so as to melt toner adhering on a sheet of copying paper. When a sheet of copying paper passes through the fixing roller 43, the toner image adhering to thereon is fixed, and then, a sheet of copying paper is discharged to the paper discharging tray 47 by the discharging roller 46 when the pivotable gating pawl member 45 is located at a position P3 as indicated by a real line in FIG. 1.

On the other hand, in the image write mode for printing an image of image data sent from an external unit such as a host computer onto a sheet of copying paper on which a document image has been printed in order to print a composite image composed of a document image and an image of image data thereon, the pivotable gating nail member 45 is rotated so as to be located at a position P4 as indicated by a dotted line in FIG. 1. At that time, a sheet of copying paper on which the document image is printed has been transported sequentially by respective transportation rollers 51 to 54, and then, a sheet of copying paper reaches the register roller 37 again and waits for the next copying operation.

(c) Digital copying mode

The operation of the digital copying mode will be described below.

In the analogue copying mode, the pivotable reflection mirror 14 is located at the position P1, and then, light reflected from the document is reflected by the reflection mirror 14 so as to project the light onto the exposure position PE on the photoconductive layer 21a of the photoconductive drum 21. On the other hand, upon reading a document image in the digital copying mode or the image read mode, the pivotable reflection mirror 14 is rotated so as to be located at the position P2. Then, the reflection mirror 14 is apart from the optical path of the light reflected from the document, and the document image is formed on the line type CCD image sensor 61.

As described above, the image sensor 61 is arranged at the position shown in FIG. 1 so that a distance between the scan lens 10 and the image sensor 61 is equal to a distance between the scan lens 10 and the image forming surface of the photoconductive layer 21a of the photoconductive drum 21. The optical system between the document and the reflection mirror 13 to be used in the analogue copying mode is used in these modes. Therefore, the resolution upon reading an image using the image sensor 61 can be altered using the same control system as that to be used upon altering the magnification in the analogue copying mode.

Further, in the present preferred embodiment, the magnification in the analogue copying mode can be altered in the range from 0.5 to 2.0. However, the magnification can be altered in the range from 0.3 to 4.0 by further electrically magnifying a read image.

Figure 3:
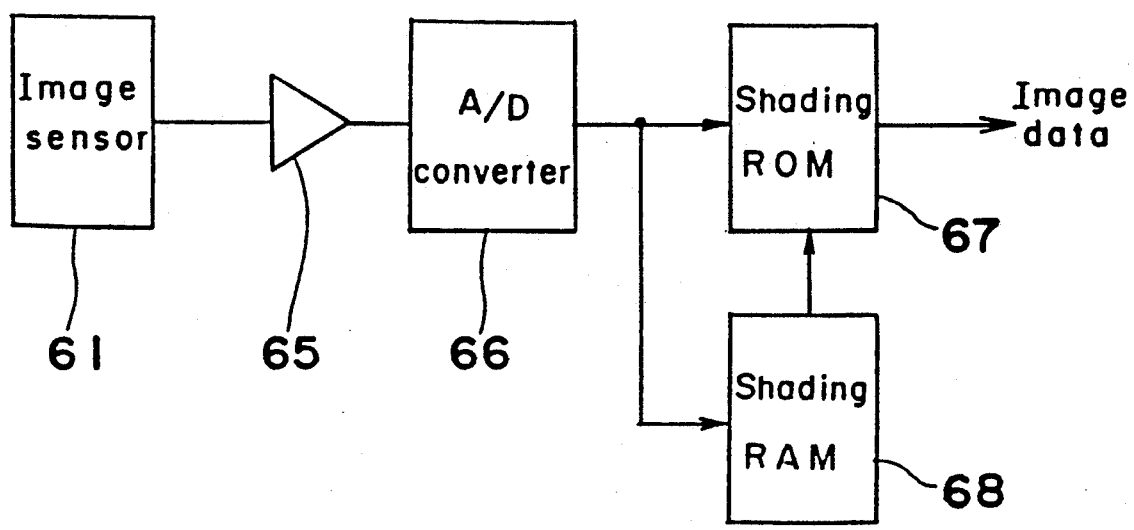
FIG. 3 is a schematic block diagram showing an image read circuit mounted in the electrophotographic copying machine shown in FIG. 1.

FIG. 3 shows an image read circuit 60.

Figure 5:
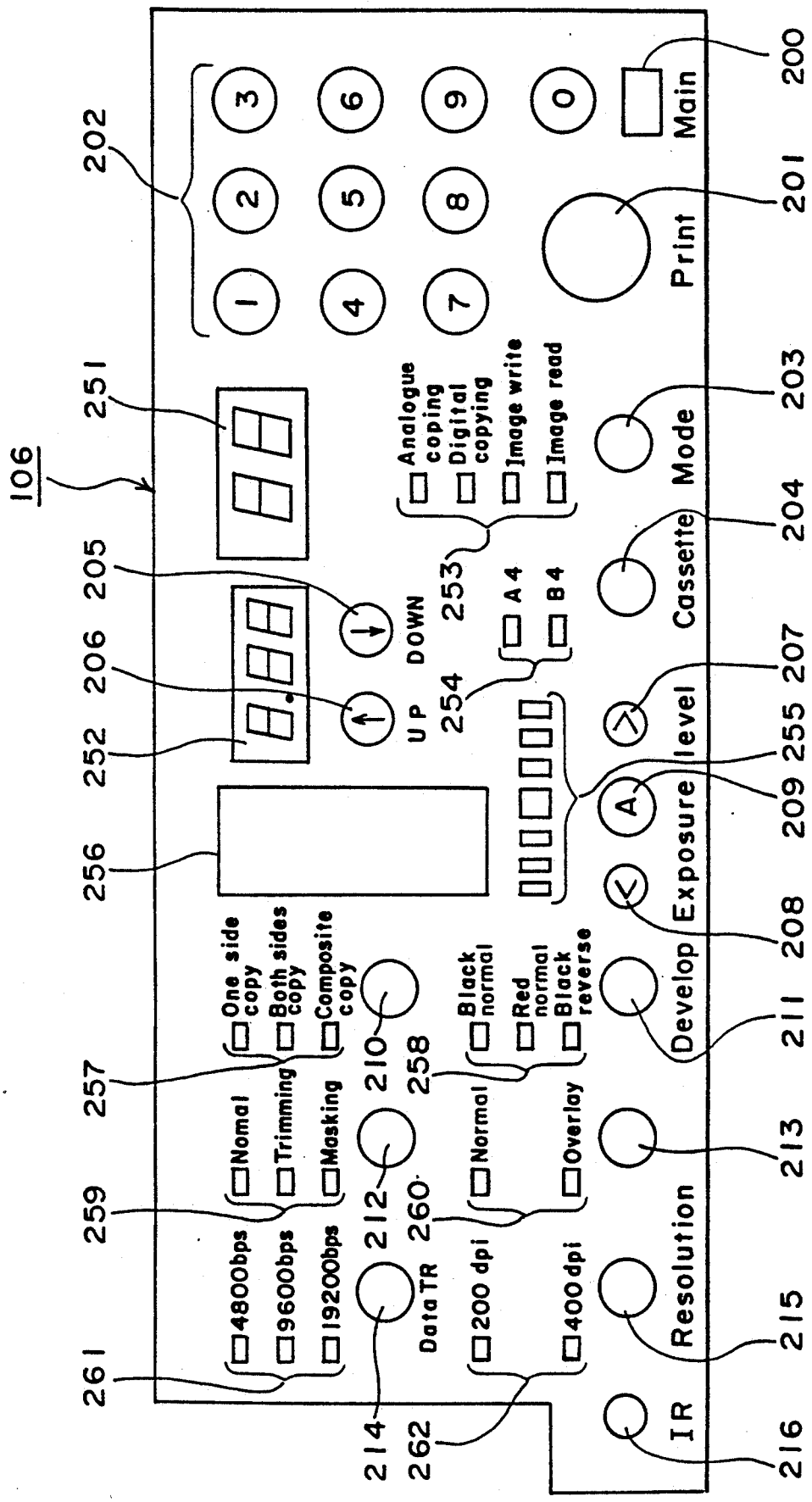
FIG. 5 is a front view showing an operation panel shown in FIG. 4.

Referring to FIG. 5, a document image is read and converted into analogue electric signals by the CCD image sensor 61, and the analogue electric signals are amplified by an amplifier 65. Thereafter, the amplified analogue electric signals are converted into digital image data by an analogue to digital converter (referred to as an A/D converter hereinafter) 66. In the present preferred embodiment, the converted image data are seven bits digital data having 128 levels in order to take decrease in the gradation due to a shading correction executed by the next step, into consideration.

In a conventional general image read system including the image read circuit 60 of the present preferred embodiment, even though a document image having a uniform density is read, the level of the digital image data outputted from the A/D converter 66 does not always become constant due to uniformity of the light amount of light radiated from the illumination lamp 4, decrease in the light amount of light passing through the outer edge of the scan lens 10, and dispersion of the sensitivity of each image sensor device.

In order to correct the dispersion produced in the optical image read system, there are provided a ROM 67 and a RAM 68 for the shading correction. Therefore, a shading in the level of the image data outputted from the A/D converter 66 is corrected by the ROM 67 and the RAM 68 in the manner well known to those skilled in the art, and then, the shading-corrected image data are outputted as read image data. A well known half tone process may be made for the shading-corrected image data by an image processor (not shown), or the shading-corrected image data may be outputted to an external unit through an interface section, if necessary. The description thereof is omitted therein since it is not the subject matter of the present invention.

(d) Composition of control system

FIG. 4 shows a control system for controlling the electrophotographic copying machine 1 of the present preferred embodiment.

Referring to FIG. 4, a main system controller 101 comprising a CPU for controlling the whole of the electrophotographic copying machine 1 is connected to an operation panel controller 105 through a communication line 121, and also is connected to a subsystem controller 102, an image processor 111, an input interface controller (referred to as an input IF controller hereinafter) 112 and an output interface controller (referred to as an output IF controller hereinafter) 113 through a communication line 122.

The subsystem controller 102 is connected to a mechanical controllers 103, a scan optical system controller 104, an image sensor controller 114 and a print head controller 115 through a communication line 123. The subsystem controller 103 controls respective controllers 103, 104, 114 and 115 according to an instruction sent from the main system controller 101, and sends information of each operation state of respective controllers 103, 104, 114 and 115 to the main system controller 101.

The mechanical controller 103 controls the units arranged around the photoconductive drum 21 and the units for feeding or transporting a sheet of paper based on a program stored therein according to an instruction sent from the main system controller 101, and sends information of each operation state of respective devices to the subsystem controller 102. For example, each operation state of the photointerrupter switches 94, 93 and 94 arranged respectively so as to oppose to the developing units 23 to 25 is supervised by the mechanical controller 103, and the mechanical controller 103 sends information of each operation state of respective photointerrupter switches 94, 93 and 94 to the subsystem controller 102, and further to the main system controller 101 through the subsystem controller 102.

The scan optical system controller 104 controls the devices of the optical system according to an instruction sent from the subsystem controller 102, and sends information of each operation state of respective devices thereof to the subsystem controller 102. Concretely, the scan optical system controller 104 controls the turning on or off operation and the light amount of the illumination lamp 4, each scan operation of the illumination unit 3 and the mirror unit 6, each movement operation of the scan lens 10 and the mirror unit 11 according to the magnification, and also calculates the scan speed of the scan optical system.

The operation panel controller 105 sends information of each operation state of the switches arranged on an operation panel 106 including mode selection switches (not shown) for selecting one or plural operation modes, to the main system controller 101, and the operation panel controller 105 also controls lighting operation of various kinds of indicators arranged on the operation panel 106. The operation panel 106 will be described in detail later.

The image sensor controller 114 receives image data sent from the CCD image sensor 61 responsive to an instruction of the subsystem controller 102, and instructs the image processor 111 to execute a specified process.

The LED head controller 115 receives image data sent from the image processor 111 or the input IF controller 112 responsive to an instruction of the subsystem controller 102, and also instructs the LED head 71 to write dot images of the image data on the photoconductive layer 21a of the photoconductive drum 21. Furthermore, the LED head controller 115 performs negative/positive reverse operation, the calculation of the printing area PA corresponding to the size of the copying paper, the editing operation of image data based on the calculated printing area PA, according to the information sent from the subsystem controller 102.

The image processor 111 performs a half tone process based on a specific dither pattern for image data sent from the image sensor controller 114 responsive to an instruction sent from the main system controller 101, and also performs compression process for image data. Further, the image processor 111 outputs the processed image data to the output IF controller 113, and outputs them to the LED head controller 115 so as to write dot images of the image data on the photoconductive layer 21a in the digital copying mode. Furthermore, the image processor 111 performs a recover process for image data received from an external unit by the input IF controller 112.

The output IF controller 113 performs communication control operation with external units responsive to an instruction sent from the main system controller 101, and outputs the image data processed by the image processor 111 to the external units.

The input IF controller 112 performs communication control operation with external units responsive to an instruction sent from the main system controller 101, and receives image data sent from the external units, and then, sends the received image data to the image processor 111 in order to convert the received image data into dot image data in a data form which can be written on the photoconductive layer 21a by the LED head 71.

The communication lines 121 and 122 which are connected to the main system controller 101 are provided for transmitting control commands and status data therethrough. The communication line 123 which is connected to the subsystem controller 102 is provided for transmitting control timing signals in addition to control commands and status data therethrough.

Control signal lines 131 and 132 for transmitting and receiving control signals between the input and output IF controllers 112 and 113 and the external units are selected depending on the external units connected thereto, and also image signal lines 133 and 134 for transmitting and receiving image data between the input and output IF controllers 112 and 113 and the external units are selected depending on the external units connected thereto.

An image signal line 135 connected between the image sensor 61 and the image sensor controller 114 and an image signal line 136 connected between the print head 71 and the print head controller 115 are image signal lines for transmitting serial image data, and the other image signal lines 137 to 140 are image signal lines for transmitting eight bits data in a parallel form.

In FIG. 4, a control section for controlling the conventional analogue electrophotographic copying machine is indicated by an alternate long and short dash line 150, and the control system of the present preferred embodiment utilizes this control section in order to constitute the electrophotographic copying machine 1. In the conventional electrophotographic analogue copying machine, the operation panel controller 105 is connected to the subsystem controller 102 through a control line 121a.

The main system controller 101 can controls composite printing operation, responsive to information of each operation state of the photointerrupter switches 93 and 94 and information of the operation entered using the operation panel 106 which is sent from the operation panel controller 105. In the composite printing operation, for example, an image of digital image data sent from an external unit such as a host computer is printed on a sheet of copying paper on which an analogue document image has been printed in the analogue copying mode. Namely, the LED head 71 writes dot images corresponding to the digital image data sent from the external unit so as to form an electrostatic latent image corresponding to the dot images on the photoconductive layer 21a of the photoconductive drum 21, and the electrostatic latent image is developed into a visible toner image in the manner as described above. When the register roller clutch (not shown) is started, the visible toner image is transferred onto a sheet of copying paper.

(e) Operation panel

Figure 6:
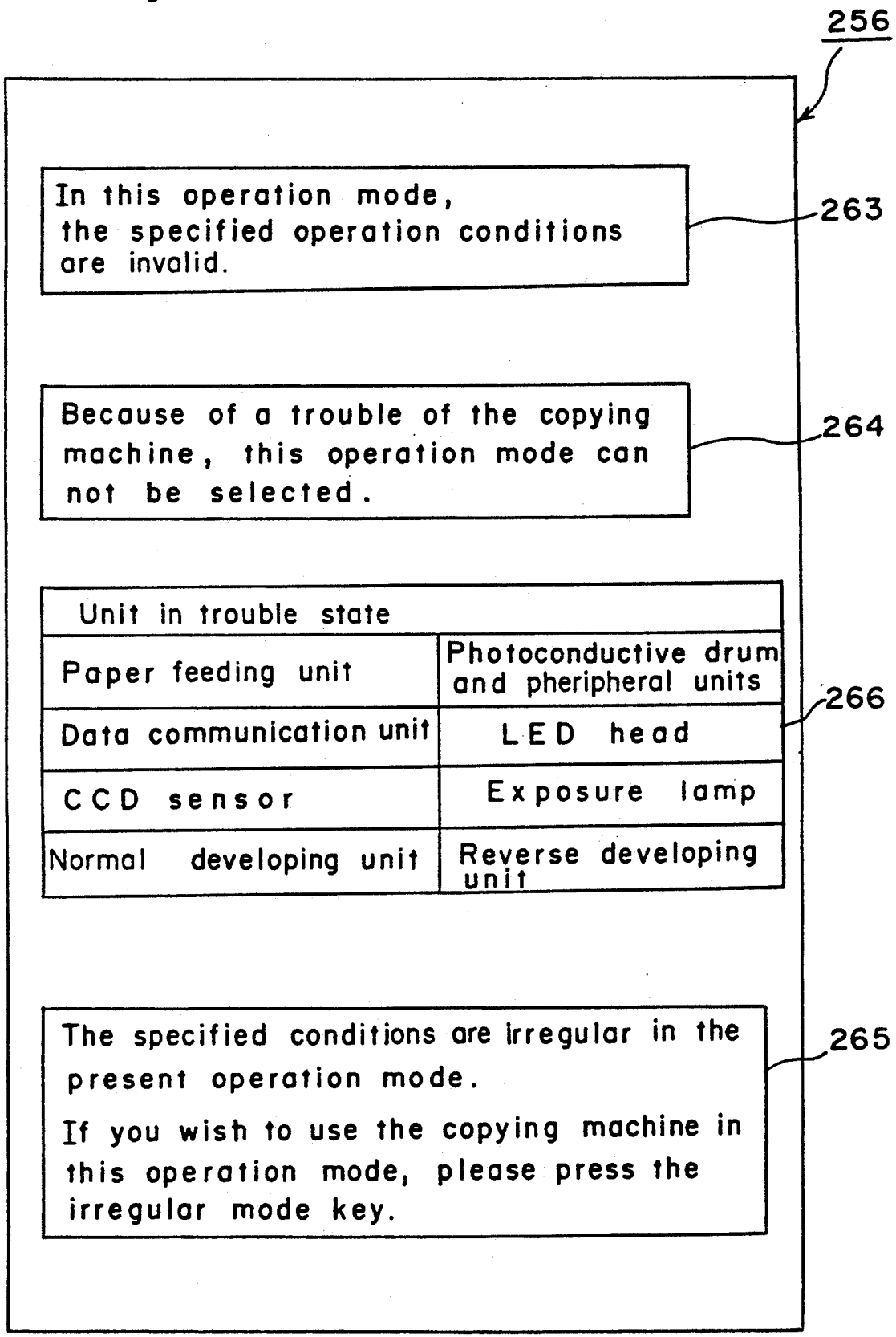
FIG. 6 is a front view showing a liquid crystal display provided on the operation panel shown in FIG. 5.

FIG. 5 is a front view showing the operation panel 106 shown in FIG. 4, and FIG. 6 is a front view showing an liquid crystal display (referred to as an LCD hereinafter) provided on the operation panel 106.

On the operation panel 106, there are provided a main switch 200 for starting to supply the power to the copying machine 1 so that the copying machine 1 can operate, a print start key 201, a set of ten key 202 for setting a number of prints, a operation mode selection key 203 for setting one of the four operation modes, a paper feeding cassette selection key 204 for selecting one of the paper feeding cassettes 31 and 32, a magnification setting key 205 for setting a magnification upon image reduction, a magnification setting key 206 for setting a magnification upon image enlargement, an exposure level up key 207 for increasing the exposure level, an exposure level down key 208 for decreasing the exposure level, an exposure level automatic adjustment key 209 for selecting a mode for automatically adjusting the exposure level, a both sides/composite copying mode selection 210 for selecting one of one side copying mode, both sides copying mode and the composite copying mode, a developing unit selection key 211 for selecting one of the black normal developing unit 25, the black reverse developing unit 24 and the red normal developing unit 23, a trimming/masking setting key 212 for setting a trimming operation or a masking operation, an overlay setting key 213 for setting an overlay operation, a data transmission rate setting key 214 for setting one of the data transmission rates of 4800 bps, 9600 bps and 19200 bps, a reading resolution setting key 215 for setting one of the reading resolutions of 200 dpi and 400 dpi, and an irregular mode setting key 216 for setting the irregular mode.

Further, on the operation panel 106, there are mounted LEDs 251 for displaying a number of copies, LEDs 252 for displaying a copying magnification, LEDs 253 for displaying the set operation mode, LEDs 254 for displaying the selected paper feeding cassette (the selected size of the copying paper), LEDs 255 for displaying the exposure level, an LCD 256 for displaying various kinds of messages, LEDs 257 for displaying selected one of the one side copying mode, the both sides copying mode and the composite copying mode, LEDs 258 for displaying the selected one developing unit, LEDs 259 for displaying selection of the trimming operation or selection of the masking operation, LEDs 260 for displaying selection of the overlay operation, LEDs 261 for displaying the selected data transmission rate, and LEDs 262 for displaying the selected reading resolution.

Referring to FIG. 6, the LCD 256 of the operation panel 106 displays an invalid warning message 263, a unit trouble message 264, an irregular message 265, and a trouble unit indicator 266 for displaying units in trouble, which are described in detail later.

(f) Control flow of control system (f-1) Main routine

Figure 7A:
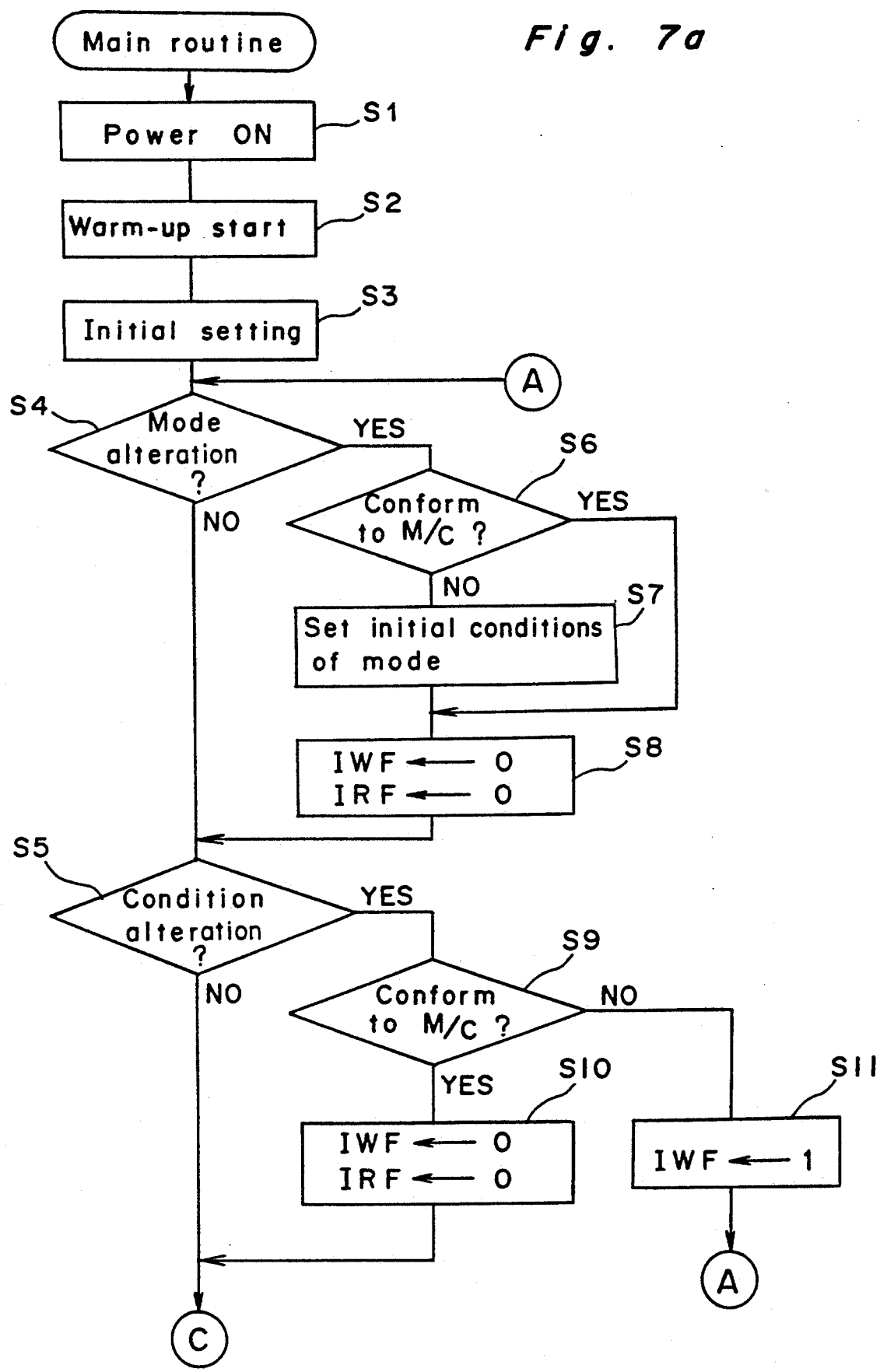
Figure 7B:
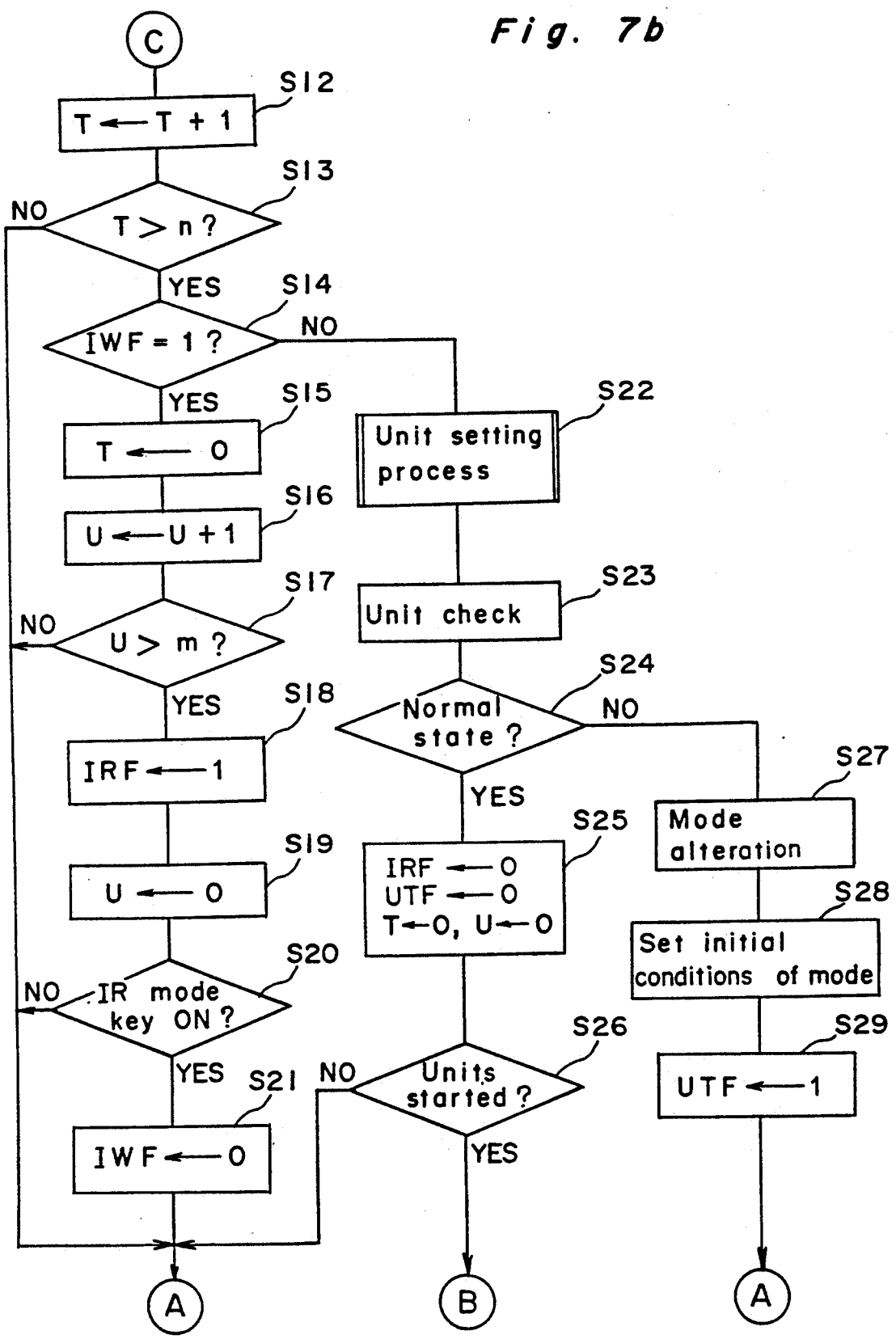

FIGS. 7a to 7c are flowcharts of a main routine which is executed by the main system controller 101 shown in FIG. 4.

Referring to FIG. 7a, when the main switch 200 is turned on at step S1 so as to supply the power to the copying machine of composite function type, a warm-up operation of the fixing unit is started at step S2, and then, an initial setting process is executed at step S3.

The top priority operation mode in the copying machine of composite function type of the present preferred embodiment is the image write mode. In the initial setting process of step S3, the image write mode is set, and then, the initial setting values in the image write mode which are predetermined as shown in Table 1 are set as the operation conditions of the copying machine 1 of the composite function type.

Table 1 shows an available range and an initial setting value of each operation condition in respective operation modes. In the column of the available range described in Table 1, the available ranges described within ( ) can be set in the irregular mode.

Table 2 shows the operation conditions in respective operation modes. In Table 2, "O" denotes that the operation condition indicated thereby can be set in the normal mode, "Δ" denotes that the operation condition indicated thereby can be set only in the irregular mode, and "-" denotes the operation condition indicated thereby can not set or the operation condition indicated thereby is no meaning.

Further, in the initial setting process of step S3, routine counters T and U are reset to zero.

Thereafter, it is judged at step S4 whether or not the operation mode has been altered, and then, it is judged at step S5 whether or not at least one operation condition has been altered. If the operation mode has not been altered (No at step S4) and at least one operation condition has not been altered (No at step S5), the program flow goes to step S12 of FIG. 7b, the routine counter T is incremented by one, and then, it is judged at step S13 whether or not the count value of the routine counter T is larger than a predetermined positive integer value n. If the count value of the routine counter T is not larger than the predetermined value n (No at step S4), the program flow goes back to step S4. Namely, a check routine of steps S4, S5, S12 and S13 is repeated until the count value of the routine counter T becomes larger than the predetermined value n. In the present preferred embodiment, the predetermined value n is set at 49, and a time interval of one check routine is about 10 msec..

After the check routine is repeated 50 times so that a time of about 0.5 second has been passed or the count value of the routine counter T is larger than the predetermined value n (Yes at step S13), it is judged at step S14 whether or not an invalid warning flag IWF is set at one. When the invalid warning flag IWF is set at one (Yes at step S14), it is judged that the operation conditions set by the operator do not conform to the available operation conditions of the operation mode which has been set, and such an invalid warning message 263 that the specified operation conditions are invalid in the set operation mode has been displayed on the LCD 256 of the operation panel 106. On the other hand, when the invalid warning flag IWF is reset to zero, the display of the invalid warning message 263 is turned off.

Figure 12:
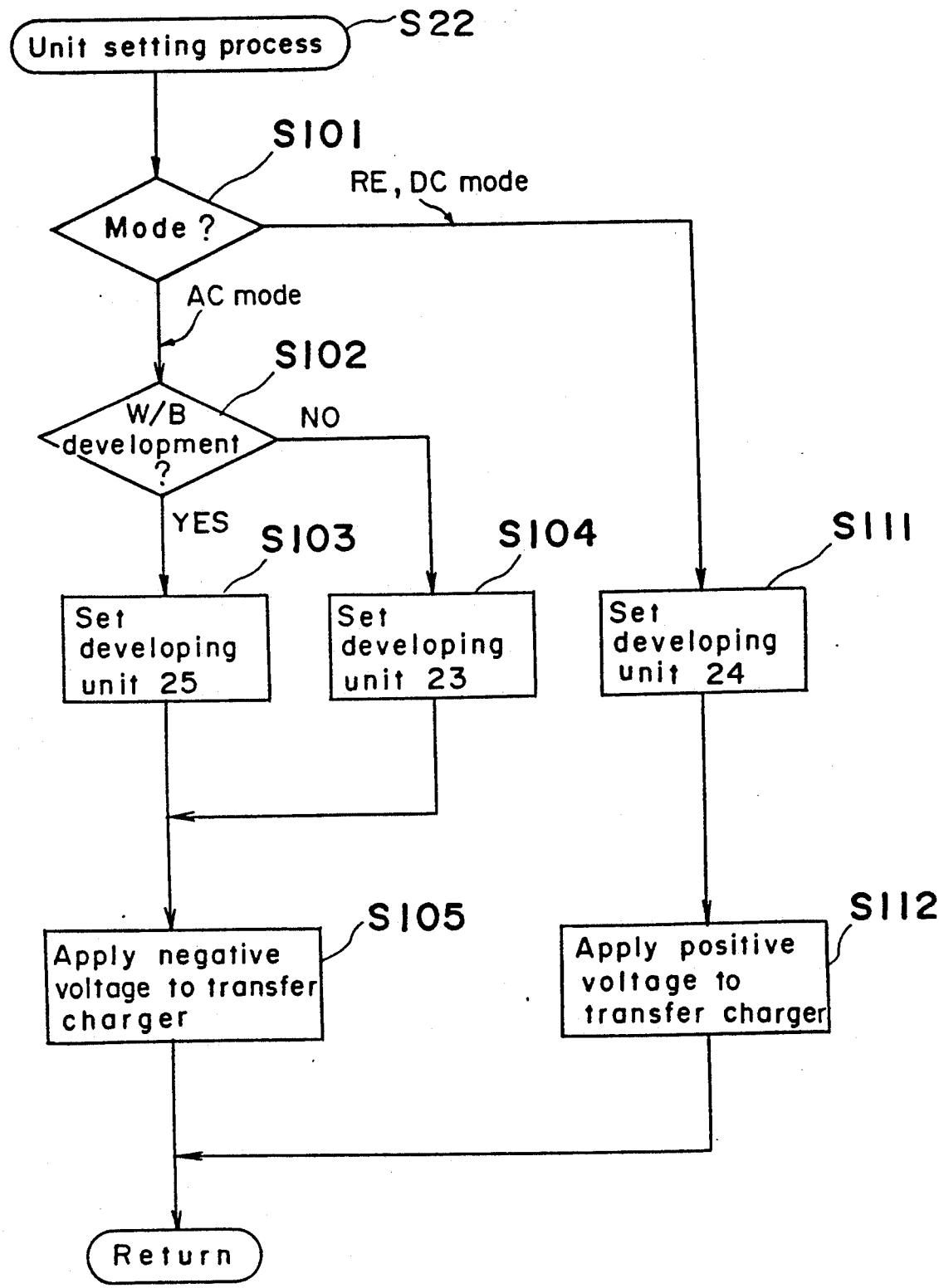
FIG. 12 is a flowchart showing a unit setting process of a subroutine which is executed by the main system controller shown in FIG. 4.

If the invalid warning flag IWF is not set at one (No at step S14), respective sections of the units are set so as to become available according to the set operation mode and the set operation conditions at step S22 of FIG. 12. Thereafter, it is checked at step S23 whether or not respective units can operate in a normal state at that time. It is to be noted that respective units are set so as to become available about 0.5 second thereafter with use of the routine counter T in order to prevent abrasion of respective units which may be caused.

The judgment of step S23 is performed in order to judge whether or not respective units are available in the set operation mode. Table 3 shows units where troubles may be caused in respective operation modes. In Table 3, "O" denotes that the unit is available in the specified operation mode, and "x" denotes that the unit is not available in the specified operation mode. Therefore, it is judged at step S24 whether or not the units can operated in a normal state. Namely, at step S24, if at least one unit is not available depending on the operation mode and the unit where a trouble is caused, it is judged then that the units are in an abnormal state (No at step S24). On the other hand, if all the units are available in the set operation mode, it is judged then that the units are in a normal state. Therefore, for example, when only a paper jam is caused on a paper feeding unit, it is judged that the units are in an abnormal state since the paper feeding unit is not available in the analogue copying mode, the digital copying mode and the image write mode. On the other hand, since the paper feeding unit is available in the image read mode, it is judged that the units are in a normal state.

If it is judged that the units are in an abnormal state (No at step S24), the operation mode is altered at step S27. At step S27, when the image write mode has been set, the operation mode is altered to the image read mode. When the image read mode has been set, the operation mode is altered to the digital copying mode. When the digital copying mode has been set, the operation mode is alerted to the analogue copying mode. When the analogue copying mode has been set. the operation mode is altered to the image write mode. Thereafter, after the initial setting values of the altered operation mode are set at step S28, a unit trouble flag UTF is reset to zero at step S29, the unit trouble message 264 shown in FIG. 6 is displayed on the LCD 256 of the operation panel 106, and then, the program flow goes back to step S4.

On the other hand, if it is judged that the units are in a normal state (Yes at step S24), the program flow goes to step S25, both an irregular flag IRF and the unit trouble flag UTF are reset to zero, and also the routine counters T and U are reset to zero. Thereafter, it is judged at step S26 whether or not the units have been started in this state. If the units have not been started yet (No at step S26), the program flow goes back to step S4, the check routine of steps S4, S5, S12 and S13 is repeated, and then, the operation state of the main system controller 101 becomes a waiting state.

In this waiting state, if the operation mode is altered (Yes at step S4), the program flow goes to step S6, it is judged whether or not the various kinds of operation conditions which have been selected conform to the operation conditions of the altered operation mode. It is to be noted that the judgment of step S6 is performed since there is a possibility of the operator's altering the operation conditions prior to alteration of the operation mode. If operation conditions which have been selected do not conform to the operation conditions of the altered operation mode (No at step S6), the initial setting values of the altered operation mode are set as the operation conditions at step S7, and then, the program flow goes to step S8. On the other hand, if the operation conditions which have been selected conform to the operation conditions of the altered operation mode (Yes at step S6), the program flow goes to step S8, directly.

At step S8, both the invalid warning flag IWF and the irregular flag IRF are reset to zero. Namely, as described above, if the operator alters the operation conditions and the altered operation conditions conform to the available operation conditions of the selected operation mode, the invalid warning flag IWF is reset to zero without altering the operation conditions.

Further, after the initial setting process of step S3 or in the waiting state after the operation mode is altered, if the operation mode has been altered (Yes at step S5), the program flow goes to step S9, it is judged whether or not the operation conditions which have been altered conform to the operation conditions of the selected operation mode. If the operation conditions which have been altered conform to the operation conditions of the selected operation mode (Yes at step S5), both the invalid warning flag IWF and the irregular flag IRF are reset to zero at step S10, and then, the program flow goes to step S12, or the program flow goes back to the above-mentioned waiting state.

In this case, there are the following four cases when setting the operation conditions which have been altered in the set operation mode.

(a) There are set the operation conditions which conform to the set operation mode.

(b) There are set the operation conditions which are no meaning for the selected operation mode, such as selection of the size of the paper feeding cassette in the image read mode.

(c) There are set irregular operation conditions for the selected operation mode, such as the negative/positive reverse development in the analogue copying mode.

(d) There are set operation conditions which can not be used in the selected operation mode, such as selection of a developing unit with color toner which is not provided therein.

In the above-mentioned cases (b) and (d), the copying machine may be constituted so that the key operation for setting the operation conditions can not be accepted. However, in the present preferred embodiment, the operation conditions are altered. It is to be noted that the copying machine can operate only when the irregular mode is set as described later in the above case (c) in the present preferred embodiment.

On the other hand, if there are set the operation conditions corresponding to the cases (b), (c) and (d) which do not conform to the set operation mode such as a case that the negative/positive reverse development is set in the analogue copying mode (No at step S9), the program flow goes to step S11, the invalid warning flag IWF is set at one, and the above-mentioned invalid warning message 263 shown in FIG. 6 is displayed on the LCD 256 of the operation panel 106. Thereafter, the program flow goes back to step S4.

After setting the invalid warning flag IWF at one at step S11, the operation mode may be altered again or the operation condition may be altered again. At that time, if the set operation conditions conform to the operation mode, the invalid warning flag IWF is reset to zero at step S8 or S10. On the other hand, if the operation mode or the operation condition has not been altered and the number of times of the check routine or the count value of the routine counter T becomes larger than the predetermined value n (Yes at step S13), it is judged at step S14 whether or not the invalid warning flag IWF is set at one.

If the invalid warning flag IWF is set at one (Yes at step S14), the count value of the routine counter T is reset to zero at step S15, and then, a routine counter U is incremented by one at step S16. Thereafter, it is judged at step S17 whether or not the count value of the routine counter U is larger than a predetermined positive integer value m. If the count value of the routine counter U is equal to or smaller than the predetermined value m (No at step S17), the program flow goes back to step S4, and then, the above-mentioned process is repeated. On the other hand, if the count value of the routine counter U becomes larger than the predetermined value m (Yes at step S17), the irregular flag IRF is set at one at step S18. Then, in order to warn the operator that the operation conditions which have been set are irregular in the selected operation mode, the irregular message 265 shown in FIG. 6 is displayed on the LCD 256 of the operation panel 106.

In the present preferred embodiment, the above-mentioned value m is set at 19. Therefore, if the operation conditions are altered so as to confirm to the available operation conditions of the set operation mode (No at step S14) for a waiting time interval of 10 seconds:

the waiting time interval
= 10 msec. × ($n + 1$) × ($m + 1$)
= 10 msec. × (49 + 1) × (19 + 1)
= 10 sec., the unit setting process is executed at step S22. However, if the operation conditions are not altered so as to confirm to the available operation conditions of the operation mode (Yes at step S14), the irregular flag IRF is set at one, at step S18, as described above. The irregular flag IRF which is set at one at step S18 is reset to zero when the operation mode or the operation condition is altered at step S4 or S5 and the set operation conditions conform to the operation mode.

After setting the irregular flag IRF at one at step S18, the count value of the routine counter U is reset to zero at step S19. In this case, if the operator wishes to use the copying machine 1 in this state intentionally, for example, in such a case that the copying machine 1 of composite function type is checked upon the maintenance thereof, or in such a case that there is a large desire of the operator to use the copying machine 1 in this state, even though the operation conditions are irregular, and further the irregular mode setting key 216 is pressed (Yes at step S20), the invalid warning flag IWF is reset to zero at step S21, the operation is permitted in the irregular mode. Thereafter, in the next routine, the program flow goes from step S14 to step S22, and the above-mentioned unit setting process is executed at step S23. On the other hand, if the irregular mode setting key 216 has not been pressed (No at step S20), the program flow goes back to step S4, and then, the above-mentioned check routine is repeated.

In the present preferred embodiment, the reason why the irregular mode is provided in the copying machine 1 is that the operation of the irregular mode can be performed in the copying machine 1, however, the copying machine 1 is constituted so that the operation of the irregular mode can not be normally performed. The setting operation by the operator can be simplified with compared with the conventional setting operation, and the operation conditions can be prevented from being set by mistake.

In the present preferred embodiment, the irregular message 265 is displayed on the LCD 256 of the operation panel 106 a predetermined time after the invalid warning message 263 is displayed thereon, however, the present invention is not limited to this. When it is judged that the set operation conditions are irregular, the irregular message 265 is displayed on the LCD 256 without displaying the invalid warning message 256 thereon.

Further, if the units are in an abnormal state (No at step S24), the program flow goes to step S27, the operation mode is altered in the predetermined manner as described above, the predetermined initial setting values of the altered operation mode are set at step S28, and then, the unit trouble flag UTF is set at one at step S29. However, on the other hand, if the operation mode is altered (Yes at step S4) or the operation condition is altered (Yes at step S5) and further the valid warning flag IWF is reset to zero, the unit setting process is executed in the altered operation mode or the altered operation conditions, and then, the unit check process is performed at step S23. On the other hand, if the units are in a normal state (Yes at step S24), the unit trouble flag UTF is reset to zero, and also, both the routine counters T and U are reset to zero at step S25.

Figure 9:
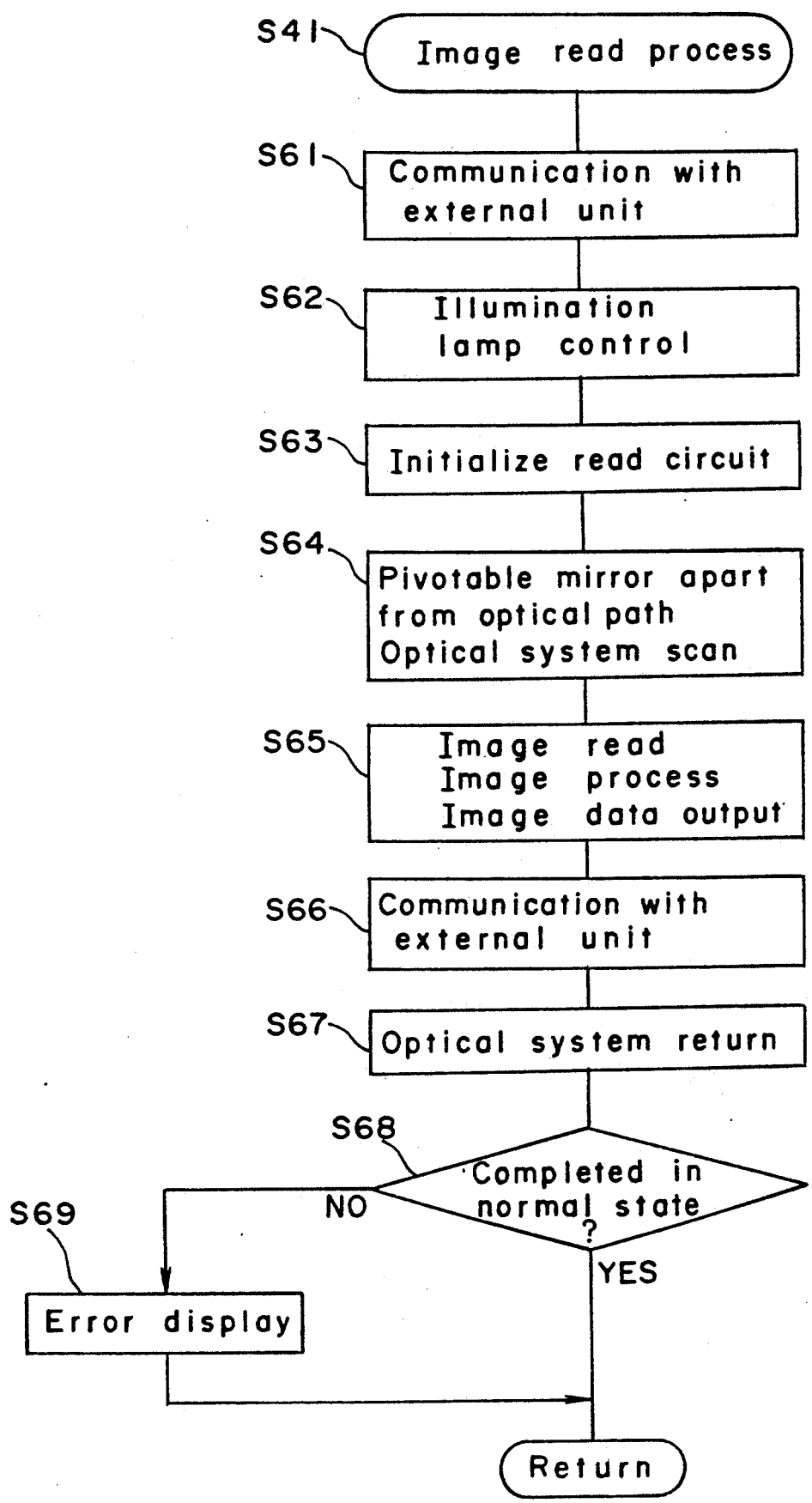
FIG. 9 is a flowchart showing an image read process of a subroutine which is executed by the main system controller shown in FIG. 4.
Figure 10:
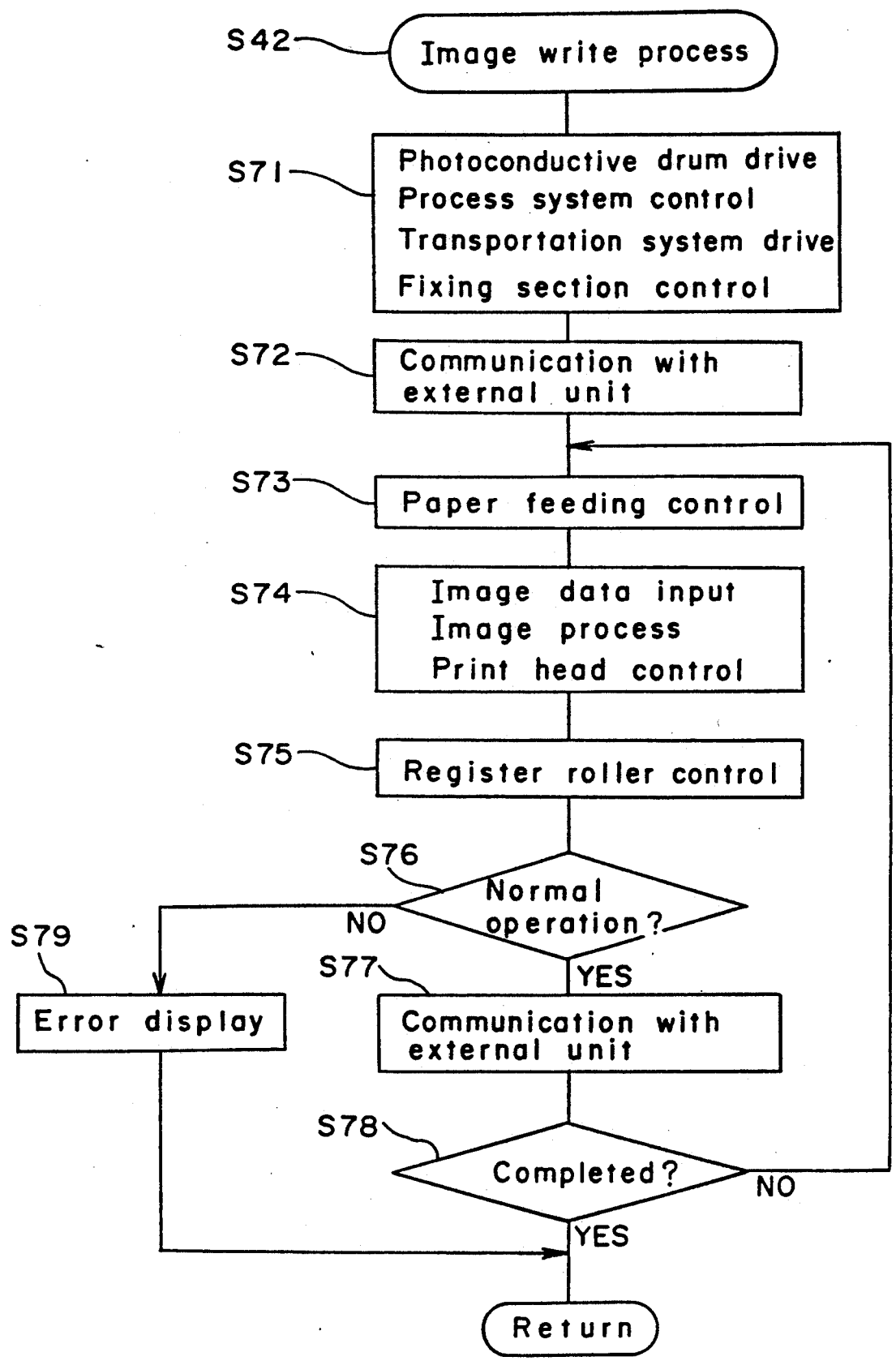
FIG. 10 is a flowchart showing an image write process of a subroutine which is executed by the main system controller shown in FIG. 4.

Thereafter, if the units are started (Yes at step S26), the program flow goes to step S30 of FIG. 7c, and then, it is judged whether or not the set operation mode is the image read mode. If the image read mode is set (Yes at step S30), an image read process shown in FIG. 9 is executed at step S41, and then, the program flow goes to the check routine from step S4. On the other hand, if an operation mode other than the image read mode is set (No at step S30), it is judged at step S31 whether or not the warm-up process of the fixing unit is completed. If the warm-up process is not completed (No at step S31), the program flow goes to the check routine from step S4. On the other hand, if the warm-up process is completed (Yes at step S31), it is judged at step S32 whether or not the set operation mode is the image write mode. If the image write mode is set (Yes at step S32), the program flow goes to step S42, an image write process shown in FIG. 10 is executed, and then, the program flow goes to the check routine from step S4.

Figure 11:
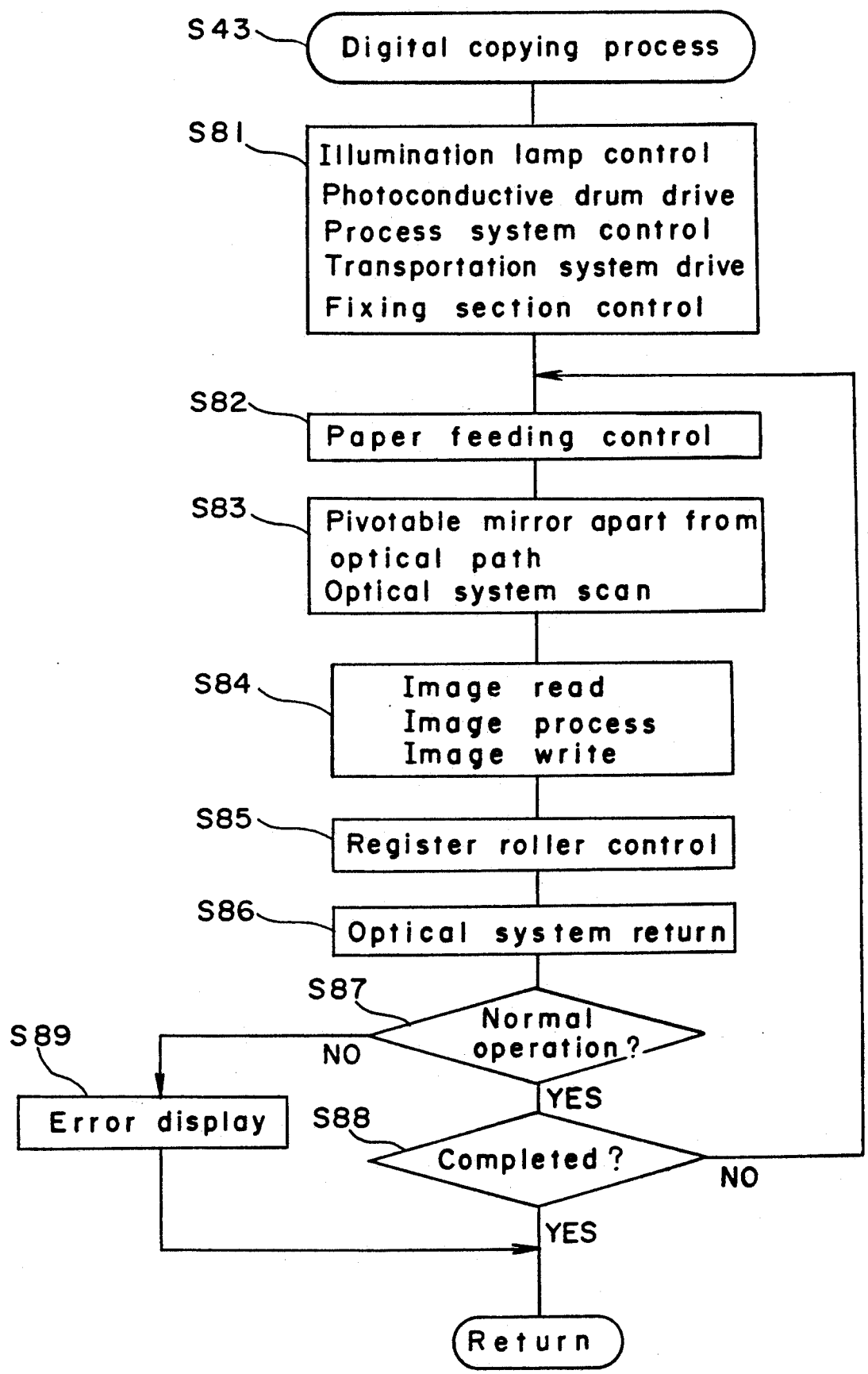
FIG. 11 is a flowchart showing an digital copying process of a subroutine which is executed by the main system controller shown in FIG. 4.

If the image write mode is not set (No at step S32), it is judged at step S34 whether or not the set operation mode is the digital copying mode. If the digital copying mode is set (Yes at step S34), a digital copying process shown in FIG. 11 is executed at step S43, and then, the program flow goes to the check routine from step S4. Further, if the digital copying mode is not set or the analogue copying mode is set (No at step S34), an analogue copying process shown in FIG. 8 is executed at step S44, and then, the program flow goes to the check routine from step S4.

(f-2) Analogue copying process

Figure 8:
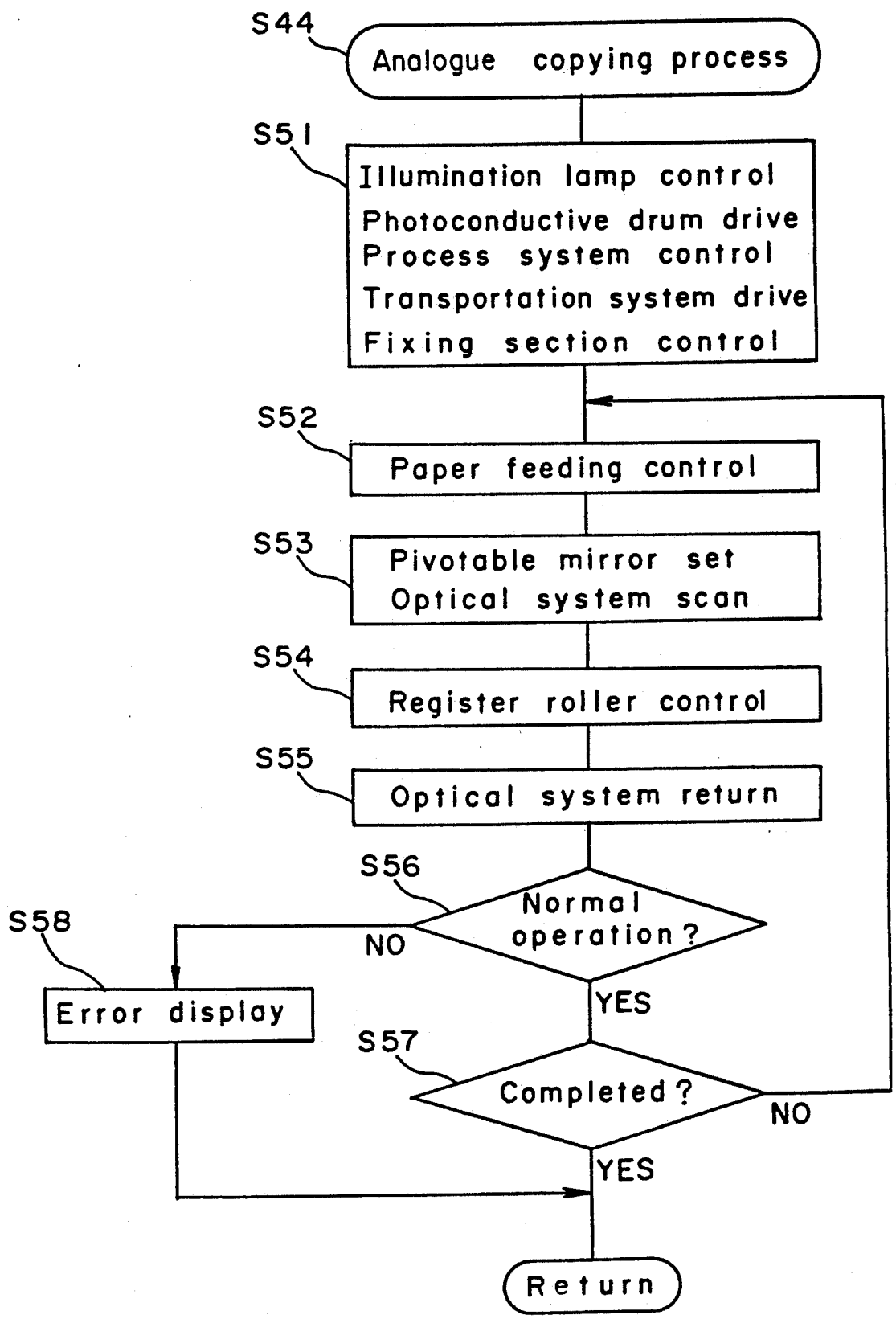
FIG. 8 is a flowchart showing an analogue copying process of a subroutine which is executed by the main system controller shown in FIG. 4.

FIG. 8 is a flowchart showing an analogue copying process (step S44 of FIG. 7c) which is executed when the analogue copying mode is selected.

Referring to FIG. 8, first of all, at step S51, the illumination lamp 4 is controlled, the photoconductor drum 21 is rotated, the electrophotographic process system is controlled, the transportation system is driven, and the fixing section is controlled, as described above. Thereafter, the paper feeding operation is controlled at step S52, and then, the pivotable reflection mirror 14 is rotated so as to located at the position P1, and the optical system is scanned ate step S53. Thereafter, a register roller control process for controlling the operation of the register roller 37 is performed ate step S54, and then, the optical system returns at step S55.

Thereafter, it is judged whether or not these units have been operated in a normal state at step S56. When these units have been operated in a normal state (Yes at step S56), the program flow goes to step S57. Otherwise (No at step S56), the program flow goes to step S58, such an error message that there is caused a trouble in the analogue copying process is displayed on the LCD 256 of the operation panel 106, and then, the program flow returns to the main routine.

At step S57, it is judged whether or not the process of the analogue copying mode is completed. When the process of the analogue copying mode is completed (Yes at step S57), the program flow returns to the main routine. Otherwise (No at step S57), the processes from steps S52 to S58 are repeated.

(f-3) Image read process

FIG. 9 is a flowchart showing an image read process (step S41 of FIG. 7c) which is executed when the image read mode is selected.

Referring to FIG. 9, first of all, the communication with an external unit such as a host computer is performed at step S61, and after a signal representing start of reading an image is received therefrom, the illumination lamp 4 is controlled ate step S62, and then, the image read circuit is initialized at step S63. Thereafter, at step S64, the pivotable reflection mirror 14 is rotated so as to be apart from the optical path, and a document set on the document table 2 is scanned by the scan optical system. Then, the image read process is performed by the CCD image sensor 61, the image process is performed, and the processed image data are outputted to the external unit at step S65. After these processes including the image read process are completed, an end signal is outputted to the external unit ate step S66, and then, the illumination unit 3 and the mirror unit 6 of the scan optical system returns the predetermined home position at step S67.

Thereafter, it is judged whether or not the process of the image read mode is completed in a normal state at step S68. When the process of the image read mode is completed in a normal state (Yes at step S68), the program returns to the main routine. Otherwise (No at step S68), such an error message that there is caused a trouble in the image read process is displayed on the LCD 256 of the operation panel 106 at step S69, and then, the program flow returns to the main routine.

(f-4) Image write process

FIG. 10 is a flowchart showing an image write process (step S42 of FIG. 7c) which is executed when the image write mode is selected.

Referring to FIG. 10, first of all, at step S71, the photoconductive drum 21 is rotated, the electrophotographic process system is controlled, the transportation system is driven, and the fixing section is controlled. Thereafter, the communication with an external unit such as a host computer is performed at step S72.

After a signal representing start of the image write process is received from the external unit at step S72, the paper feeding operation is controlled at step S73, and then, the program flow goes to step S74. At step S74, an input process for inputting digital image data sent from the external unit is performed, the process for processing the received image data is performed, and the LED head 71 is controlled. Thereafter, a register roller control process for controlling the register roller 37 is performed at step S75.

Thereafter, it is judged whether or not the process of the image write mode has been performed in a normal state at step S76. When the process of the image write mode has been performed in a normal state (Yes at step S76), the program flow goes to step S77. Otherwise (No at step S76), such an error message that there is caused a trouble in the image write process is displayed on the LCD 256 of the operation panel 106 at step S79, and then, the program flow returns to the main routine.

After the communication with the external unit is performed at step S77, it is judged whether or not the process of the image write mode is completed at step S78. When the process of the image write mode is completed (Yes at step S78), the program flow returns to the main routine. Otherwise (No at step S78), the program flow goes back to step S73, and then, the processes from step S73 to step S78 are repeated.

(f-5) Digital copying process

FIG. 11 is a flowchart showing a digital copying process (step S43 of FIG. 7c) which is executed when the digital copying mode is selected.

Referring to FIG. 11, first of all, at step S81, the illumination lamp 4 is controlled, the photoconductive drum 21 is rotated, the electrophotographic process section is controlled, the transportation system is driven, and the fixing section is controlled. Thereafter, the paper feeding operation is controlled at step S82, and then, the pivotable reflection mirror 14 is rotated to be located at the position P2 and to be apart from the optical path, and the optical system is scanned at step S83. Thereafter, a document image is read by the CCD image sensor 61, and the process for processing the read image data is performed, and the LED head 71 is controlled to write the image of the processed image data at step S84. Then, the register roller control process for controlling the register roller 37 so as to feed a sheet of copying paper is performed at step S85.

When the scan operation for scanning the document is completed, the illumination unit 3 and the mirror unit 6 of the scan optical system return at step S86. Thereafter, it is judged whether or not the process of the digital copying mode has been executed in a normal state at step S87. When the process of the digital copying mode has been executed in a normal state (Yes at step S87), the program flow goes to step S88. Otherwise (No at step S87), such an error message that there is caused a trouble in the digital copying process is displayed on the LCD 256 of the operation panel 106 at step S89, and then, the program flow returns to the main routine.

At step S88, it is judged whether or not the process of the digital copying mode is completed. When the process of the digital copying mode is completed (Yes at step S88), the program flow returns to the main routine. Otherwise (No at step S88), the program flow goes back to step S82 in order to execute the next digital copying operation.

(f-6) Unit setting process

FIG. 12 is a flowchart of the unit setting process (step S22 of FIG. 7b) for setting the developing units 23 to 25 and the transfer charger 26 in the predetermined operable state.

Referring to FIG. 12, first of all, the operation mode is checked at step S101. When the analogue copying mode has been selected at step S101, either the developing unit 23 or 25 is set in a operable state at step S103 or S104, respectively. Namely, it is judged whether or not the white/black developing operation is to be performed at step S102. In the case of the white/black developing operation, the developing unit 25 containing the black color toner is set in an operable state at step S103, and then, the program flow goes to step S105. In the case of the color copying operation (No at step S102), the developing unit 23 containing the red color toner is set in an operable state, and then, the program flow goes to step S105. At step S105, a negative voltage is applied to the transfer charger 26 at step S105, and then, the program flow returns to the main routine.

On the other hand, when either the image read mode or the digital copying mode has been selected at step S101, the reverse developing operation is performed. Namely, the developing unit 24 for performing the reverse developing operation is set in an operable state at step S111, and then, a positive voltage is applied to the transfer charger 26 at step S112. Thereafter, the program flow returns to the main routine.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

TABLE 1

| Operation conditions (Operation mode) | Available range | Initial setting value |
|---|---|---|
| Paper feeding cassettes (Size of paper) | A4, B4 | A4 |
| Number of prints | 1 to 99 | 1 |
| Magnification upon copying (Analogue copying mode) | 0.5 to 2.0 | 1.0 |
| Magnification upon copying (Digital copying mode) | 0.3 to 4.0 | 1.0 |
| Magnification upon reading (Image read mode) | (0.5 to 2.0) | 1.0 |
| Magnification upon copying (Image write mode) | (0.6 to 2.0) | 1.0 |
| Exposure level | Automatic, Manual (7 steps) | Automatic |
| Developing unit (Analogue copying mode) | BREGD, RREGD, (BREVD) | BREGD |
| Developing unit (Digital copying mode) | BREVD (BREGD, RREGD) | BREVD |
| Developing unit (Image write mode) | BREVD (BREGD, RREGD) | BREVD |
| Data transmission rate [bps] | 4800, 9600, 19200 | 9600 |
| Resolution upon reading [dpi] | 200, 400 | 200 |
| Trimming and Masking (AC and DC modes) | Use, Non-use | Non-use |
| Trimming and Masking (RE and WR modes) | (Use) Non-use | Non-use |
| Overlay | Use, Non-use | Non-use |

Notes
(a) The operation range described within () in the column of the available range can be used only in the regular mode.
(b) BREGD: Black normal developing unit RREGD: Red normal developing unit BREVD: Black reverse development unit

TABLE 2

| Operation conditions | AC mode | RE mode | WR mode | DC mode |
|---|---|---|---|---|
| Paper feeding cassettes (Size of paper) | ○ | — | ○ | ○ |
| Number of prints | ○ | △ | ○ | ○ |
| Magnification upon reading or copying | ○*1 | △*1 | △*2 | ○*3 |
| Exposure level | ○ | ○ | — | ○ |
| Developing unit | ○*4 | — | ○*5 | ○*5 |
| One side/Both sides/Composite copy | ○ | — | ○ | ○ |
| Image processing conditions | — | ○ | ○ | ○ |
| Data transmission rate | — | ○ | ○ | — |
| Resolution upon reading | — | ○ | — | ○ |
| Trimming | ○ | △ | △ | ○ |
| Masking | ○ | △ | △ | ○ |

TABLE 2-continued

| Operation conditions | AC mode | RE mode | WR mode | DC mode |
|---|---|---|---|---|
| Overlay | o*6 | Δ | Δ | o |

Notes
(a) "o" denotes that the operation mode can be used in the normal mode.
(b) "Δ" denotes that the operation mode can be used in irregular mode.
(c) *1: The magnification can be changed only in the range from 0.5 to 2.0.
(d) *2: The magnification can be changed only in the range from 0.6 to 2.0.
(e) *3: The magnification can be changed only in the range from 0.3 to 4.0.
(f) *4: Only the black normal developing unit can be used in the normal mode, and both the black normal developing unit and the black reverse developing unit can be used in the irregular mode.
(g) *5: Only the black reverse developing unit can be used in the normal mode, and all the black normal developing unit, the black reverse developing unit and the red normal developing unit can be used in the irregular mode.
(h) *6: This operation can be performed in a composite print process by either a combination of the analogue copying process and the digital copying process, or a combination of the analogue copying process and the image write process.

TABLE 3

| Units | AC mode | DC mode | WR mode | RE mode |
|---|---|---|---|---|
| Paper feeding unit | x | x | x | o |
| Peripheral units arranged around Photoconductive drum | x | x | x | o |
| Data communication unit | o | o | x | x |
| LED head | o | x | x | o |
| CCD image sensor | o | x | o | x |
| Optical system such as Exposure lamp | x | x | o | x |
| Normal developing unit | x | o | o | o |
| Reverse developing unit | o | x | x | o |

What is claimed is:

1. An image handling apparatus operable in plural operation modes comprising:
   first setting means for setting one operation mode among said plural operation modes;
   second setting means for setting an operation condition in each of said operation modes;
   storage means for storing plural predetermined operation conditions, each one of said plural predetermined operation conditions corresponding to one of said plural operation modes;
   judgment means for judging whether or not said operation condition set by said second setting means is inhibited in the operation mode set by said first setting means; and
   control means, when another operation mode is set by said first setting means after said operation condition is set by said second setting means, for automatically setting said predetermined operation conditions stored by said storage means corresponding to the set operation mode in the case that it is judged by said judgment means that said operation condition set by said second setting means is inhibited in the set operation mode.

2. The apparatus as claimed in claim 1,
   wherein said predetermined operation conditions are initial setting conditions which are preset when a main switch of said apparatus is turned on.

3. An image handling apparatus operable in plural operation modes comprising:
   setting means for setting any one operation mode among said plural operation modes;
   judgment means for judging whether or not said apparatus can operate in said operation mode set by said setting means; and
   alteration means for automatically altering said operation mode set by said setting means to a predetermined corresponding, alternative one of plural operation modes when it is judged by said judgment means that said apparatus can not operate in said operation mode set by said setting means;
   wherein each of said plural operation modes has a predetermined corresponding operation mode.

4. The apparatus as claimed in claim 3, further comprising:
   storage means for storing plural predetermined operation conditions, each one of said plural predetermined operation conditions corresponding to a respective one of said plural operation modes; and
   control means for setting said predetermined operation conditions corresponding to the respective one of said plural operation modes which is altered by said alteration means.

5. The apparatus as claimed in claim 4,
   wherein said predetermined operation conditions are an initial setting condition which is preset when a main switch of said apparatus is turned on.

6. An image handling apparatus as claimed in claim 3, further comprising a plurality of operation units which cooperate with each other to execute the operation mode set by said setting means, wherein said judgement means judges whether or not said apparatus can operate in the operation mode set by said setting means based on whether or not each of said units is malfunctioning.

7. An image handling apparatus comprising:
   means for handling image in either an analogue copier operation mode or a digital copier operation mode;
   first setting means for setting either said analogue copier operation mode or said digital copier operation mode;
   second setting means which is operable in both said analogue copier operation mode and said digital copier operation mode, for setting one of a plurality of operation conditions;
   judgment means for judging whether or not said operation condition set by said second setting means is inhibited in the operation mode set by first setting means;
   warning means responsive to a judgement of said judgment means for warning that it is improper to combine the operation mode set by said first setting means and the operation condition set by said second setting means; and
   irregular mode setting means for setting an irregular mode such that said operation condition set by said second setting means is not inhibited in the operation mode set by said first setting means.

8. An image handling apparatus comprising:
   means for handling images in either a digital copier operation mode or an image read operation mode;
   first setting means for setting either said digital copier operation mode or said image read operation mode;
   second setting means which is operable in both said digital copier operation mode and said image red operation mode, for setting one of a plurality of operation conditions;
   judgment means for judging whether or not said operation condition set by said second setting means is inhibited in the operation mode set by said first setting means;
   warning means responsive to a judgment of said judgment means for warning that it is improper to combine the operation mode set by said first setting means and the operation condition set by said second setting means; and irregular mode setting means for setting an irregular mode such that said operation condition set by said second setting means is not inhibited in the operation mode set by said first setting means.

9. An image handling apparatus comprising:
means for handling images in either a digital copier operation mode or an image write operation mode;
first setting means for setting either said digital copier operation mode or said image write operation mode;
second setting means which is operable in both said digital copier operation mode and said image write operation mode, for setting one of a plurality of operation conditions;
judgment means for judging whether or not said operation condition set by said second setting means is inhibited in the operation mode set by said first setting means;
warning means responsive to a judgment of said judgment means for warning that it is improper to combine the operation mode set by first setting means and the operation condition set by said second means; and
irregular mode setting means for setting an irregular mode such that said operation condition set by said second setting means is not inhibited in the operation mode set by said first setting means.

10. An image handling apparatus comprising:
means for handling images in one operation mode among a digital copier mode, an image read mode and an image write mode;
first setting means for setting one operation mode among said digital copier mode, said image read mode and said image write mode;
second setting means, which is operable in both said digital copier operation mode and said image read mode, for setting one of a plurality of operation conditions;
judgment means for judging whether or not said operation condition set by said second setting means is inhibited in the operation mode set by said first setting means;
warning means responsive to a judgment of said judgment means for warning that it is improper to combine the operation mode set by said first setting means and the operation condition set by said second setting means; and
irregular mode setting means for setting an irregular mode such that said operation condition set by said second setting means is not inhibited in the operation mode set by said first setting means.

11. An image handling apparatus comprising:
means for handling images in either an analogue copier mode or a digital copier mode;
first setting means for setting either said analogue copier mode or said digital copier mode;
second setting means, which is operable in both said analogue copier mode and said digital copier mode, for setting one of a plurality of developing devices which include a normal developing device and a reverse developing device;
judgment means for judging whether or not said reverse developing device is set by said second setting means when the analogue copier mode is et by said first setting means; and
warning means responsive to a judgment of said judgment means for warning that it is inhibited to set said reverse developing device in said analogue copier mode.

12. An image handling apparatus comprising:
means for handling images in one operation mode among a plurality of operation modes having respective predetermined magnification ranges that are different from each other;
first setting means for setting one operation mode among said plurality of operation modes;
second setting means which is operable in any one of said operation modes, for setting a magnification;
judgment means for judging whether or not said magnification set by said second setting means is within the predetermined magnification range of said one operation mode set by said first setting means; and
warning means responsive to a judgment of said judgment means for warning that the magnification set by said second setting means is invalid.

13. The apparatus as claimed in claim 11, further comprising irregular mode setting means for setting an irregular mode such that said reverse developing device set by said second setting means is not inhibited in the analogue copier mode set by said first setting means.

14. The apparatus as claimed in claim 12, further comprising irregular mode setting means for setting n irregular mode such that said magnification set by said second setting means is not inhibited in the operation mode set by said first setting means.

* * * * *